United States Patent
Lee et al.

(10) Patent No.: US 10,551,998 B2
(45) Date of Patent: Feb. 4, 2020

(54) METHOD OF DISPLAYING SCREEN IN ELECTRONIC DEVICE, AND ELECTRONIC DEVICE THEREFOR

(71) Applicant: Samsung Electronics Co., Ltd., Suwon-si, Gyeonggi-do (KR)

(72) Inventors: Min-Kyung Lee, Suwon-si (KR); Yoon-Jeong Kang, Yongin-si (KR); Yoo-Jin Hong, Seongnam-si (KR); Lars Anders Larsson, Malmo (SE); Michael Erik Winberg, Malmo (SE); Nils Roger Andersson Reimer, Malmo (SE); Oskar Plaza Olivestedt, Kristianstad (SE); Per Marcus Eriksson, Malmo (SE)

(73) Assignee: Samsung Electronics Co., Ltd., Suwon-si (KR)

( * ) Notice: Subject to any disclaimer, the term of this patent is extended or adjusted under 35 U.S.C. 154(b) by 383 days.

(21) Appl. No.: 14/832,412

(22) Filed: Aug. 21, 2015

(65) Prior Publication Data
US 2016/0054867 A1    Feb. 25, 2016

(30) Foreign Application Priority Data
Aug. 22, 2014  (KR) .................. 10-2014-0109794

(51) Int. Cl.
*G06F 3/0482* (2013.01)
*G06F 3/0481* (2013.01)

(52) U.S. Cl.
CPC ................... *G06F 3/0482* (2013.01)

(58) Field of Classification Search
CPC ................... G06F 3/0482; G06F 3/04817
See application file for complete search history.

(56) References Cited

U.S. PATENT DOCUMENTS

| | | | | |
|---|---|---|---|---|
| 8,346,731 | B1* | 1/2013 | Tsaur | G06F 16/2228 707/673 |
| 2008/0174570 | A1* | 7/2008 | Jobs | G06F 3/0488 345/173 |
| 2009/0193358 | A1* | 7/2009 | Mernyk | G06F 3/0481 715/804 |
| 2010/0250336 | A1* | 9/2010 | Selinger | G06Q 30/02 705/26.7 |
| 2010/0262928 | A1* | 10/2010 | Abbott | G06F 3/04817 715/769 |
| 2011/0103684 | A1* | 5/2011 | Bhatt | G06T 9/00 382/166 |
| 2011/0161409 | A1 | 6/2011 | Nair et al. | |
| 2011/0307354 | A1* | 12/2011 | Erman | G06F 8/60 705/27.1 |
| 2012/0066629 | A1* | 3/2012 | Lee | G06F 3/04847 715/769 |

(Continued)

*Primary Examiner* — Rayeez R Chowdhury
(74) *Attorney, Agent, or Firm* — Jefferson IP Law, LLP

(57) ABSTRACT

A method for displaying a screen on an electronic device is provided. The method includes displaying, on a display of the electronic device, a first screen configured with a plurality of areas in which a plurality of contents are respectively displayed in a plurality of rows, and displaying, if an area is selected from among the plurality of areas, a second screen configured with one or more recommended item areas in which information related to content corresponding to the selected area is arranged.

16 Claims, 18 Drawing Sheets

(56) References Cited

U.S. PATENT DOCUMENTS

| | | | | |
|---|---|---|---|---|
| 2012/0084292 A1* | 4/2012 | Liang | ................ | G06F 17/30899 |
| | | | | 707/741 |
| 2012/0124513 A1* | 5/2012 | Shim | .................... | G06F 3/0488 |
| | | | | 715/801 |
| 2013/0132896 A1* | 5/2013 | Lee | ...................... | G06F 16/907 |
| | | | | 715/808 |
| 2013/0205210 A1* | 8/2013 | Jeon | .................... | G06F 3/04883 |
| | | | | 715/716 |
| 2013/0321340 A1* | 12/2013 | Seo | ...................... | G06F 1/1641 |
| | | | | 345/174 |
| 2014/0074652 A1* | 3/2014 | Wu | ...................... | G06F 17/212 |
| | | | | 705/26.7 |
| 2014/0165001 A1* | 6/2014 | Shapiro | .................. | G06F 16/54 |
| | | | | 715/811 |
| 2014/0344757 A1* | 11/2014 | Shin | ................... | G06F 3/04842 |
| | | | | 715/835 |
| 2015/0058766 A1* | 2/2015 | Wang | ................... | G06F 3/0482 |
| | | | | 715/765 |
| 2015/0346976 A1* | 12/2015 | Karunamuni | ....... | G06F 3/04817 |
| | | | | 715/765 |

* cited by examiner

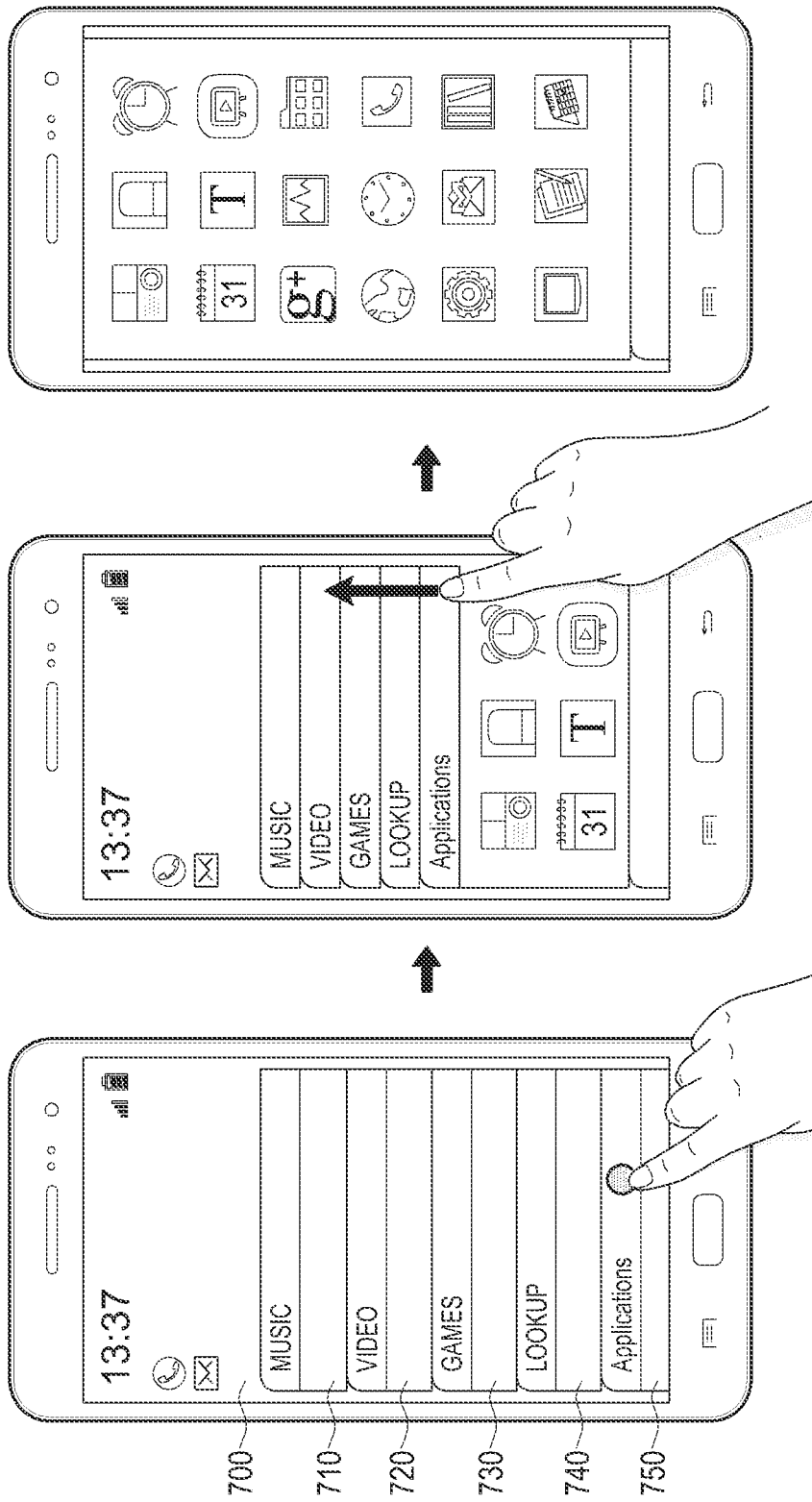

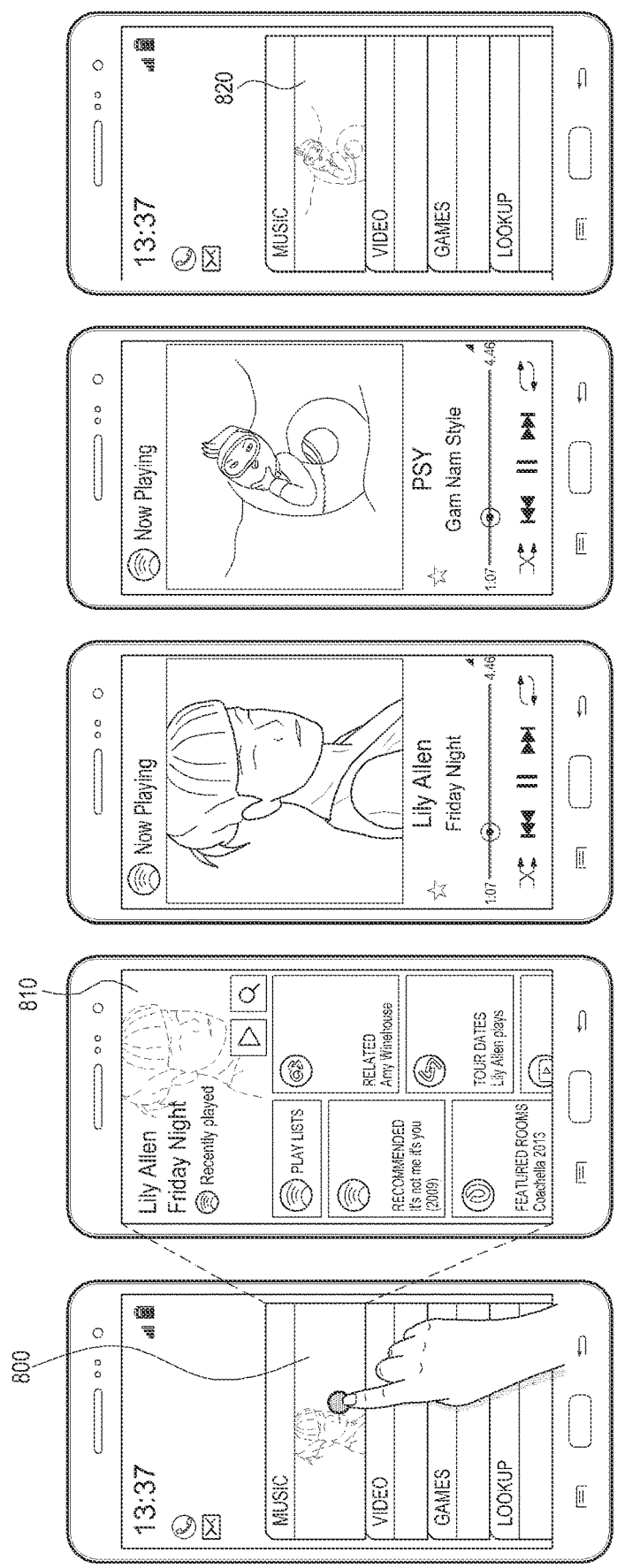

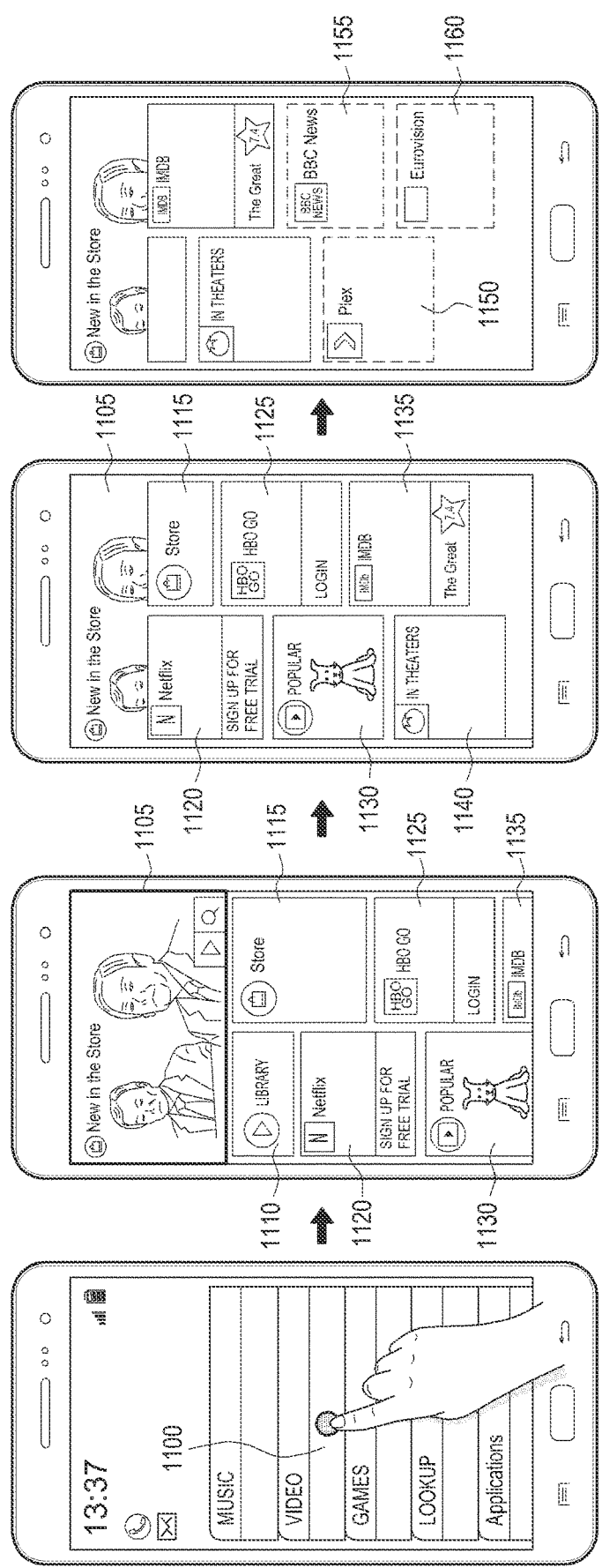

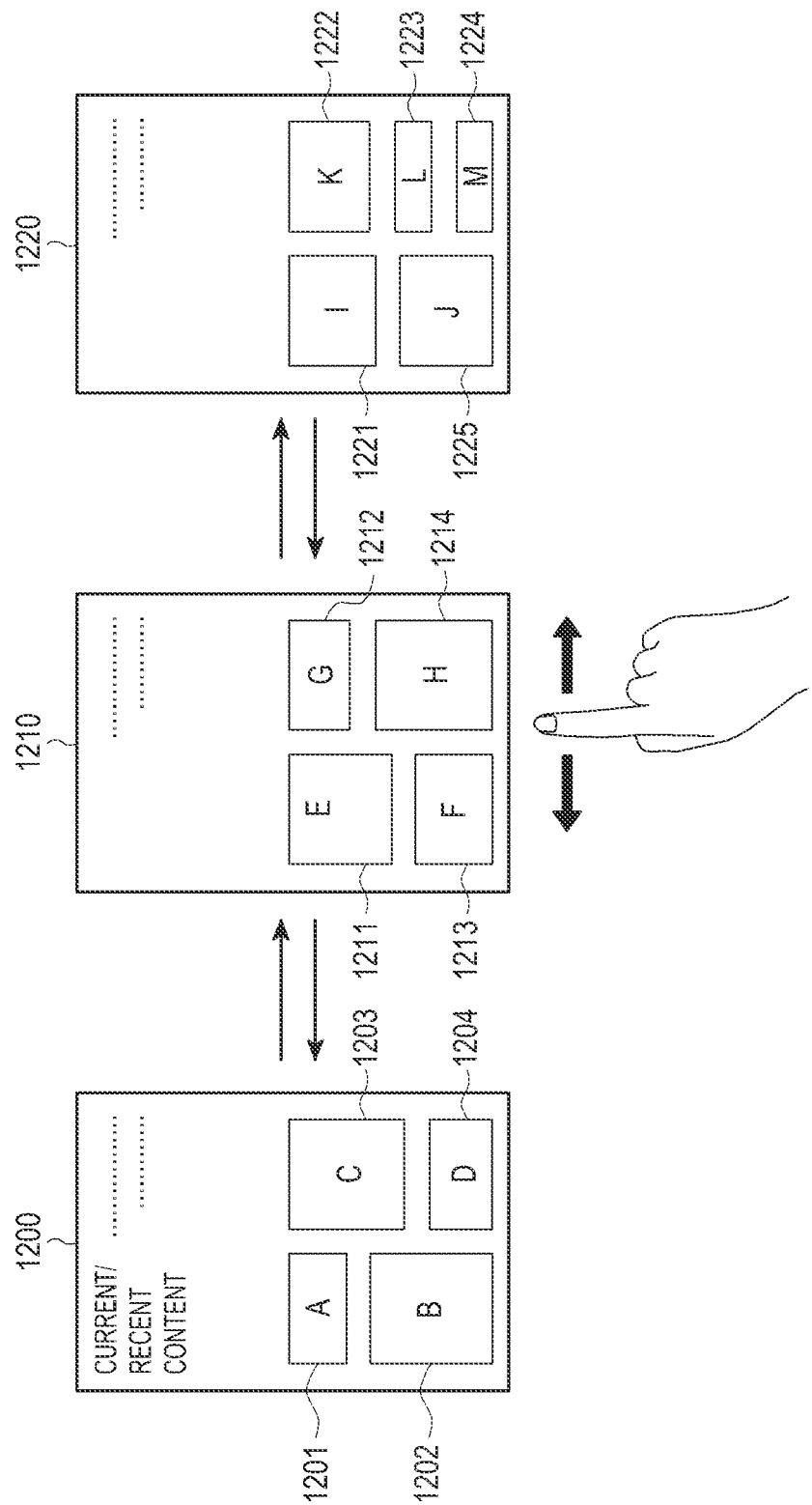

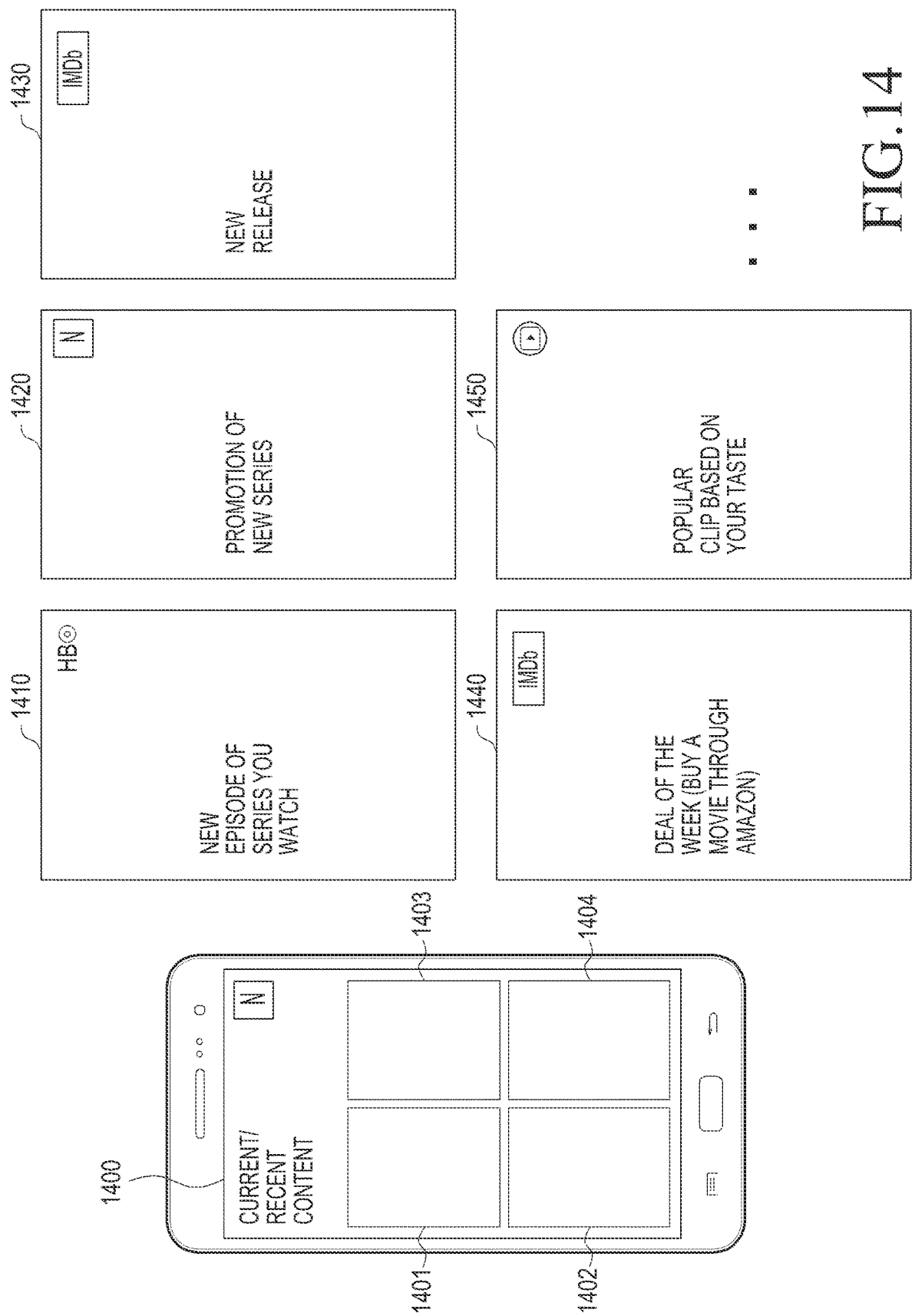

METHOD OF DISPLAYING SCREEN IN ELECTRONIC DEVICE, AND ELECTRONIC DEVICE THEREFOR

CROSS-REFERENCE TO RELATED APPLICATION(S)

This application claims the benefit under 35 U.S.C. § 119(a) of a Korean patent application filed on Aug. 22, 2014 in the Korean Intellectual Property Office and assigned Serial number 10-2014-0109794, the entire disclosure of which is hereby incorporated by reference.

TECHNICAL FIELD

The present disclosure relates to a method of displaying a screen in an electronic device, and an electronic device therefor.

BACKGROUND

As a result of recent developments in the area of mobile communication technology, electronic devices for communications with individuals, such as smart phones and tablet Personal Computers (PCs), are widely used. These electronic devices can store several tens of various applications. For example, on a touch screen of an electronic device, menu keys or shortcut keys for executing the applications are displayed in the form of icons. Accordingly, a user can execute a desired application on the electronic device by touching any one of the icons displayed on the touch screen. Also, on the touch screen of the electronic device, various forms of visual objects, such as widgets, pictures, and documents, other than the menu keys or shortcut keys are displayed.

However, as the number of applications that are executable on the electronic device increases, problems are generated, even though such applications stimulate a consumer's curiosity and satisfy a consumer's desire. One of such problems is that the number of icons that can be displayed on the small screen of the electronic device is limited, as compared to a large number of applications stored in the electronic device.

Accordingly, a user experiences an inconvenience in finding his/her desired application from among the many applications. Also, even after finding and executing a desired application, the user must search for and enter a page related to his/her desired content. This searching takes a long time.

Due to the limitation of the screen, it is necessary to classify a large number of visual objects that can be displayed on the screen. Also, the more services the electronic device provides, the longer time it takes for a user to search for a service that is suitable for a current situation. These problems are not remedied by uniformly arranging components of a layout in which objects are arranged because it is still necessary for the user to search for appropriate services and applications.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of displaying a screen in which related services are arranged so that a user can use his/her desired service conveniently, and an electronic device therefor.

Another aspect of the present disclosure is to provide a method of displaying a recommendation screen based on content so that a user can easily recognize recommended items for predetermined content, and an electronic device therefor.

In accordance with an aspect of the present disclosure, a method of displaying a screen on an electronic device is provided. The method includes displaying, on a display of the electronic device, a first screen configured with a plurality of areas in which a plurality of contents are respectively displayed in a plurality of rows, and displaying, if an area is selected from among the plurality of areas, a second screen configured with one or more recommended item areas in which information related to content corresponding to the selected area is arranged.

In accordance with another aspect of the present disclosure, an electronic device for displaying a screen is provided. The electronic device includes a display configured to display a first screen configured with a plurality of areas in which a plurality of contents are respectively displayed in a plurality of rows, and a controller configured to control the display to display, if an area is selected from among the plurality of areas, a second screen configured with one or more recommended item areas in which information related to content corresponding to the selected area is arranged.

In accordance with another aspect of the present disclosure, a non-transitory computer-readable storage medium storing instructions that, when executed, cause at least one processor to perform a method. The method includes displaying, on a screen of the electronic device, a first screen configured with a plurality of areas in which a plurality of contents are respectively displayed in a plurality of rows, and displaying, if an area is selected from among the plurality of areas, a second screen configured with one or more recommended item areas in which information related to content corresponding to the selected area is arranged.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which:

FIGS. 7A, 7B, and 7C are views for describing screen conversions when an application area is selected from among a plurality of areas of a home screen according to various embodiments of the present disclosure;

FIGS. 8A, 8B, 8C, 8D, and 8E are views for describing a process in which content that is displayed on a recommendation screen based on content changes according to various embodiments of the present disclosure;

FIGS. 11A, 11B, 11C, and 11D show examples of a recommendation screen based on video content that is displayed when video content is selected according to various embodiments of the present disclosure;

FIG. 12 is a view for describing a method for left-right movements between recommendation screens according to an embodiment of the present disclosure;

FIG. 14 shows items configuring recommendation screens according to an embodiment of the present disclosure;

Throughout the drawings, like reference numerals will be understood to refer to like parts, components, and structures.

DETAILED DESCRIPTION

Figure 1:
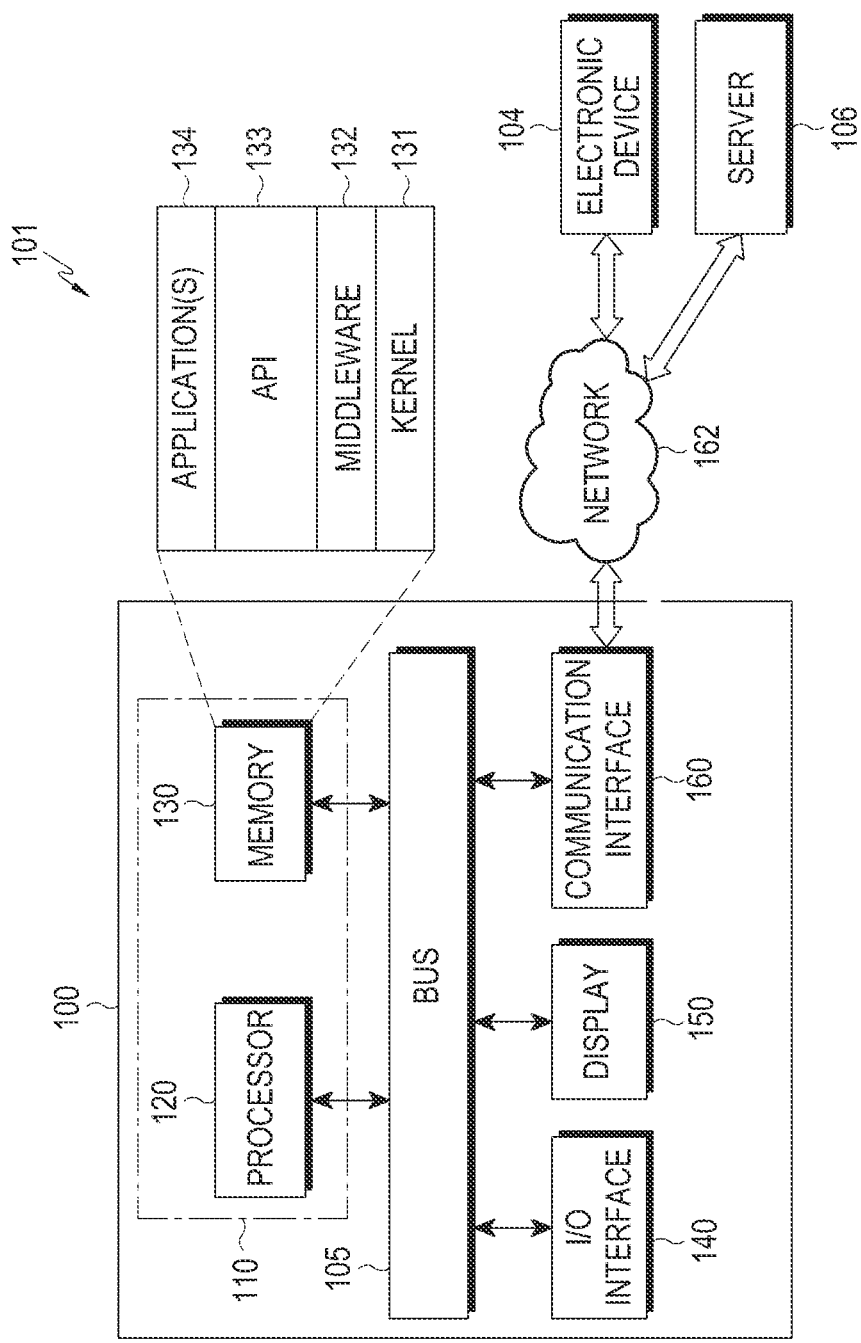
FIG. 1 is a block diagram illustrating a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure. Like numbers refer to like elements throughout the description of the figures.

It will be understood that the terms "comprises," "may comprise," "includes," and/or "may include," when used herein, specify the presence of stated functions, operations, and/or components, but do not preclude the presence or addition of one or more other functions, steps, and/or components. It will be further understood that the terms "comprises" and/or "has," when used herein, specify the presence of stated features, integers, steps, operations, elements, components and/or groups thereof, but do not preclude the presence or addition of one or more other features, integers, steps, operations, elements, components, and/or groups thereof.

As used herein, the term "or" includes any and all combinations of one or more of the associated listed items. For example, "A and/or B" may include A, B, or both A and B.

It will be understood that, although the terms first, second, etc. may be used herein to describe various components, these components should not be limited by these terms. For example, the terms do not limit the order and/or importance of the components. These terms are only used to distinguish one component from another. For example, a first user device and a second user device that are user devices indicate different user devices. For example, a first component could be termed a second component, and, similarly, a second component could be termed a first component, without departing from the scope of the present disclosure.

It will be understood that when a component is referred to as being "connected" and/or "coupled" to another component, it can be directly connected or coupled to the other component or intervening components may be present. In contrast, when a component is referred to as being "directly connected" and/or "directly coupled" to another component, there are no intervening components present.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An electronic device according to various embodiments of the present disclosure may be a device with communication capability. For example, the electronic device may be at least one of a smart phone, a tablet Personal Computer (PC), a mobile phone, a video phone, an e-Book reader, a desktop PC, a laptop PC, a Netbook computer, a Personal Digital Assistant (PDA), a Portable Multimedia Player (PMP), a MP3 player, mobile medical equipment, a camera, and/or a wearable device (for example, a Head-Mounted-Device (HMD) such as electronic glasses, electronic clothes, an electronic bracelet, an electronic necklace, an electronic Appcessory, an electronic tattoo, and/or a smart watch).

According to various embodiments, the electronic device may be a smart home appliance with communication capacity. The smart home appliance may be at least one of a Television (TV), a Digital Versatile Disk (DVD) player, audio equipment, a refrigerator, an air conditioner, a cleaner, an oven, a microwave, a washing machine, an air cleaner, a set-top box, a TV box (for example, Samsung HomeSync™, Apple TV™, Google TV™, or the like), game consoles, electronic dictionary, a camcorder, or an electronic album.

According to various embodiments, the electronic device may be at least one of various medical equipment (for example, Magnetic Resonance Angiography (MRA), Magnetic Resonance Imaging (MRI), Computed Tomography (CT), medical camcorder, ultrasonic equipment, and the like), a navigation device, a Global Positioning System (GPS) receiver, an Event Data Recorder (EDR), a Flight Data Recorder (FDR), an automotive infotainment device, electronic equipment for a ship (for example, a marine navigation device, a gyro compass, and the like), avionics, security equipment, a head unit for vehicle, an industrial or home robot, an Automatic Teller Machine (ATM) of a bank, and/or a Point of Sales (PoS) of a store.

According to various embodiments, the electronic device may be at least one of furniture or part of building/structure with communication capability, an electronic board, an electronic signature receiving device, a projector, and/or metering equipment (for example, water metering equipment, electricity metering equipment, gas metering equipment, and/or wave metering equipment). The electronic device may be one of the aforementioned devices or a combination of one or more of the aforementioned devices. Also, the electronic device may be a flexible device. It will be apparent to those of ordinary skill in the art that the electronic device according to various embodiments of the present disclosure is not limited to the aforementioned devices.

Hereinafter, an electronic device according to various embodiments of the present disclosure will be described with reference to the appended drawings. In the following description, the term "user" may indicate a person or an apparatus (for example, an intelligent electronic device) that uses the electronic device.

Specifically, FIGS. 1 through 17B, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 is a block diagram illustrating a network environment including an electronic device according to an embodiment of the present disclosure.

Referring to FIG. 1, a network environment 101 is illustrated, where the network environment 101 includes an electronic device 100 that may include a bus 105 for information communications, a processor 120 for information processing, a memory 130, an input/output (I/O) interface 140, a display 150, and a communication interface 160. The bus 105 may be a circuit to connect the aforementioned components to each other, and to allow communications (for example, a transmission of control messages) between the aforementioned components.

The processor 120 may receive commands from the aforementioned components (for example, the memory 130, the input/output interface 140, the display 150, and/or the communication interface 160) through the bus 105, interpret the received commands, and perform operations or data processing according to the interpreted commands.

According to various embodiments of the present disclosure, there is provided a controller 110 including the processor 120 and the memory 130 to store information required by the processor 120.

The controller 110, which is, in part, a Central Processing Unit (CPU), may control overall operations of the electronic device 100, and perform operations by a screen display method according to an embodiment of the present disclosure.

In order to do this, the controller 110 may control the display 150 to display a first screen configured with a plurality of areas in which a plurality of contents are respectively displayed in a plurality of rows. The plurality of contents may be classified according to service categories, and accordingly, a layout in which areas according to service categories are arranged may be displayed in the display 150. The layout may be a home screen. If an area is selected from among the plurality of areas configuring the layout, the controller 110 may control the display 150 to display a second screen in which information related to content corresponding to the selected area is arranged in the areas according to the recommended items.

In order to do this, the controller 110 may search for content corresponding to the selected area, that is, one or more recommended items related to a service category. Accordingly, the controller 110 may configure a layout with one or more areas for the found recommended items, and display the layout. Thereby, a user can see a recommendation screen in which related objects are arranged in response to his/her operation or in correspondence to the characteristics of content that he/she is using on the electronic device. Also, the user can easily check recommended items, and have a large variety of choice.

In order to configure a layout with one or more recommended items, the controller 110 may store recommended items according to service categories in the memory 130. As such, if a database in which recommended items are stored to correspond to service categories is used, recommended items can be easily searched for. Alternatively, when an event of selecting a service category (or recommended items) occurs, the controller 110 may provide information about attributes of the selected service category to an external server, and receive recommended items related to the corresponding content from the external server. The layout may be configured with a plurality of areas, and one or more objects related to content may be arranged in each area.

According to various embodiments of the present disclosure, in the area of each recommended item, information related to the corresponding content may be displayed in the form of at least one of text, an image, audio, and video.

Also, according to various embodiments of the present disclosure, objects that are arranged in the areas of the recommended items may be various visual objects, such as shortcut icons for executing applications, contents, messages, contact numbers, call history, Social Network Service (SNS) content, widgets, icons representing documents of various file formats, pictures, music files, text, and folders. Also, the objects may be visual objects selected from among the visual objects. That is, the objects mean various information that are stored in digital formats in the electronic device 100.

The applications, which are applications that are executable on the electronic device 100, may have been stored in the memory 130 of the electronic device 100 or downloaded from an external server 106, for example, a web server for providing applications. Also, the objects may be displayed in the forms of icons or buttons that are images, text, pictures, or combinations thereof. Also, each area may display information describing a title or characteristics of the corresponding object, together with the object, wherein the information may be text or an image.

The memory 130 may store commands or data received from or generated by the processor 120 or other components (for example, the input/output interface 140, the display 150, the communication interface 160, etc.). The memory 130 may include programming modules, such as a kernel 131, middleware 132, an Application Programming Interface (API) 133, and/or application(s) 134. Each of the programming modules may be software, firmware, hardware, or a combination of two or more of the aforementioned devices.

The kernel 131 may control or manage system resources (for example, the bus 105, the processor 120, and/or the memory 130) which the other programming modules (for example, the middleware 132, the API 133, and/or the application(s) 134) use to execute their operations or functions. Also, the kernel 131 may provide an interface to enable the middleware 132, the API 133, and/or the application(s) 134 to access individual components of the electronic device 100 and to control or manage the components.

The middleware 132 may act as an intermediary so that the API 133 and/or the application(s) 134 can communicate with the kernel 131 to receive/transmit data from/to the kernel 131. Also, the middleware 132 may perform, when operation requests are received from the application(s) 134, controlling for the operation requests, for example, by allocating priority capable of using a system resource (for example, the bus 105, the processor 120, and/or the memory 130) of the electronic device 100 to the application(s) 134.

The API 133 may be an interface to enable the application(s) 134 to control functions that are provided by the kernel 131 and/or the middleware 132. The API 133 may include at least one interface or function (for example, commands), for example, for file control, window control, image processing, characters control, and the like.

The input/output interface 140 may transfer a command or data received from a user through an input/output device (for example, a sensor, a keyboard, and/or a touch screen) to the processor 120, the memory 130, and/or the communication interface 160, for example, through the bus 105. For example, the input/output interface 140 may provide data about input means, such as a user's finger or an electronic pen, received through a touch screen, to the processor 120.

According to an embodiment of the present disclosure, an input device of the input/output interface 140 may include a touch panel, a (digital) pen sensor, a key, or an ultrasonic input device. The touch panel may be a capacitive type, a resistive type, an infrared type, or an ultrasonic type. The touch panel may be implemented as at least one panel that can recognize a user's various inputs including a single- or multi-touch input, a drag input, a writing input, and a drawing input, using a finger or an object such as a pen.

For example, the touch panel may be implemented using a panel that can recognize both finger inputs and pen inputs. Also, the touch panel may be implemented using two panels including a touch recognition module that can recognize finger inputs and a pen recognition module that can recognize pen inputs. Also, the touch panel may further include a control circuit. If the touch panel is a capacitive type, the touch panel can recognize proximity as well as physical contact. The touch panel may further include a tactile layer, so that the touch panel may give a user tactile impression. Also, the input/output interface 140 may output a command or data received from the processor 120, the memory 130, and/or the communication interface 160, for example, via the bus 105, through an input/output device (for example, a speaker and/or a display).

The display 150 may display various information (for example, multimedia data, text data, etc.) for the user. The display 150 may display various screens according to various operation states of the electronic device 100, execution of an application, or a service. According to an embodiment of the present disclosure, the display 150 may display a recommendation screen in which content-based related objects are arranged.

Also, the controller 110 may detect various user inputs received through a camera module and/or a sensor module, as well as the input/output interface 140. The user input may include, as well as a touch input, various kinds of information, such as a user's gesture, voice, a pupil's movement and a biometric signal, which is input to the electronic device 100. The controller 110 may perform a predetermined operation or function corresponding to the detected user input.

The communication interface 160 may enable the electronic device 100 to communicate with an external electronic devices (for example, an electronic device 104 and/or the server 106). For example, the communication interface 160 may connect to a network 162 through wired or wireless communication to communicate with the external electronic device. The wireless communication may include at least one of Wireless Fidelity (WiFi), Bluetooth (BT), Near Field Communication (NFC), a Global Positioning System (GPS), and/or cellular communication (for example, Long-Term Evolution (LTE), Long-Term Evolution Advanced (LTE-A), Code Division Multiple Access (CDMA), Wideband Code Division Multiple Access (WCDMA), Universal Mobile Telecommunications System (UMTS), Wireless Broadband (WiBro), Global System for Mobile Communications (GSM), and the like). The wired communication may include at least one of a Universal Serial Bus (USB), a High Definition Multimedia Interface (HDMI), Recommended Standard 232 (RS-232), and/or a Plain Old Telephone Service (POTS).

According to an embodiment, the network 162 may be a telecommunications network. The telecommunications network may include at least one of a computer network, the Internet, the Internet of Thing (IoT), and/or a telephone network. According to an embodiment, a protocol (for example, a transport layer protocol, a data link protocol, and/or a physical layer protocol) for communication between the electronic device 100 and an external electronic device may be supported by at least one of the application(s) 134, the API 133, the middleware 132, the kernel 131, and/or the communication interface 160.

Each of the above-described units of the electronic device 100 according to various embodiments of the present disclosure may be configured with one or more components, and the units may be termed according to a kind of the corresponding electronic device 100. The electronic device 100 may include at least one of the above-described units. Also, the electronic device 100 may omit some of the above-described units or further include another unit(s). Furthermore, some of the units of the electronic device 100 may be combined to constitute entity which performs the same functions as the corresponding units.

The term "module" used in the present disclosure may means a unit including, for example, hardware, software, firmware, and/or a combination thereof. The "module" may be interchangeably used with another term, such as "unit," "logic," "logical block," "component," and/or "circuit." The "module" may be a minimum unit or a part of components integrated into one body. Also, the "module" may be a minimum unit or a part for performing one or more functions. The "module" may be implemented mechanically and/or electronically. For example, the "module" may include at least one of an Application-Specific Integrated Circuit (ASIC) chip, Field-Programmable Gate Arrays (FPGAs), and/or a programmable-logic device, which performs certain operations, already developed or to be developed in future.

According to various embodiments, at least one part of an apparatus (for example, modules or their functions) and/or a method (for example, operations) according to various embodiments of the present disclosure may be implemented as an instruction stored in computer-readable storage media, for example, in the form of a programming module. When the instruction is executed by one or more processors (for example, the processor 120), the one or more processors may perform a function corresponding to the instruction. The computer-readable storage media may be, for example, the memory 130. At least one part of the programming module may be implemented (for example, executed) by the processor 120. At least one of the programming module may include a module, a program, a routine, sets of instructions, or a process for performing one or more functions.

The computer-readable storage media may include magnetic media (for example, a hard disk, a floppy disk, and a magnetic tape), optical media (for example, Compact Disc Read Only Memory (CD-ROM) and DVD), magneto-optical media (for example, floptical disk), and hardware device (for example, Read Only Memory (ROM), and Random Access Memory (RAM), and flash memory) specifically configured to store and perform a program instruction (for example, a programming module). Also, the programming instruction may include a high-level language code that can be executed by a computer using an interpreter, as well as a machine code that is created by a compiler. The hardware device may be configured to operate as at least one software module for performing operations according to various embodiments of the present disclosure, and vice versa.

Figure 2:
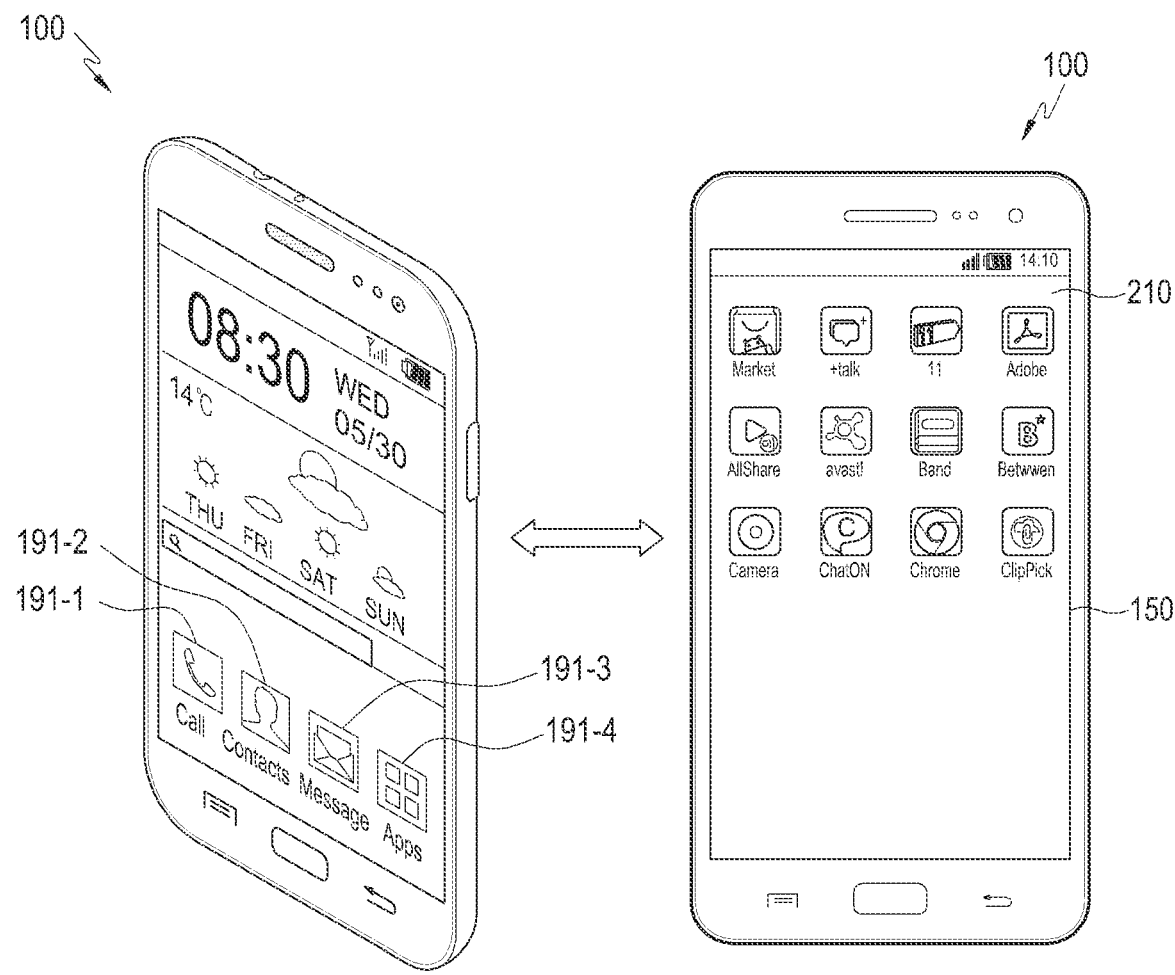
FIG. 2 shows an example of a screen in which a plurality of objects are arranged in an electronic device according to an embodiment of the present disclosure.

FIG. 2 shows an example of a screen in which a plurality of objects are arranged in an electronic device according to an embodiment of the present disclosure.

Referring to FIG. 2, an electronic device 100 is illustrated, where the electronic device 100 includes a display 150 that may be positioned in the front, center portion of the electronic device 100. The display 150 may occupy the major part of the front side of the electronic device 100. In FIG. 2, an example in which a main home screen is displayed on the display 150 is shown. The main home screen may be a screen that is first displayed on the display 150 when the electronic device 100 is powered on. Also, if the electronic device 100 has different home screens of several pages, the main home screen may be a first home screen among the home screens of several pages. For example, the home screen displays shortcut icons 191-1, 191-2, and 191-3 for executing applications that are often used, a main menu conversion key 191-4, time information, weather information, etc. If a user selects the main menu conversion key 191-4, a menu screen 210 in which a plurality of application icons are arranged on the display 150 may be displayed.

Referring to FIG. 2, in the menu screen 210, various visual objects such as shortcut icons for executing applications that are executable on the electronic device 100 may be arranged in a matrix form of rows and columns. As such, the electronic device 100 which is a smart phone or a table PC may store several tens of or several hundreds of applications herein. Accordingly, in order for a user to execute a desired application using the electronic device 100, he/she needs to turn over the pages of the menu screen 210 to find a desired application from among many applications, which may take a long time.

According to various embodiments of the present disclosure, by arranging objects for executing related applications and information about the objects in a layout configured with a plurality of areas, and displaying the layout on the display 150, a user can quickly find a desired object and related objects.

According to various embodiments of the present disclosure, a method and apparatus are provided for configuring a screen to enable a user to quickly and easily search for visual objects such as icons displayed on the display 150 of the electronic device 100, which will be described below.

Figure 3:
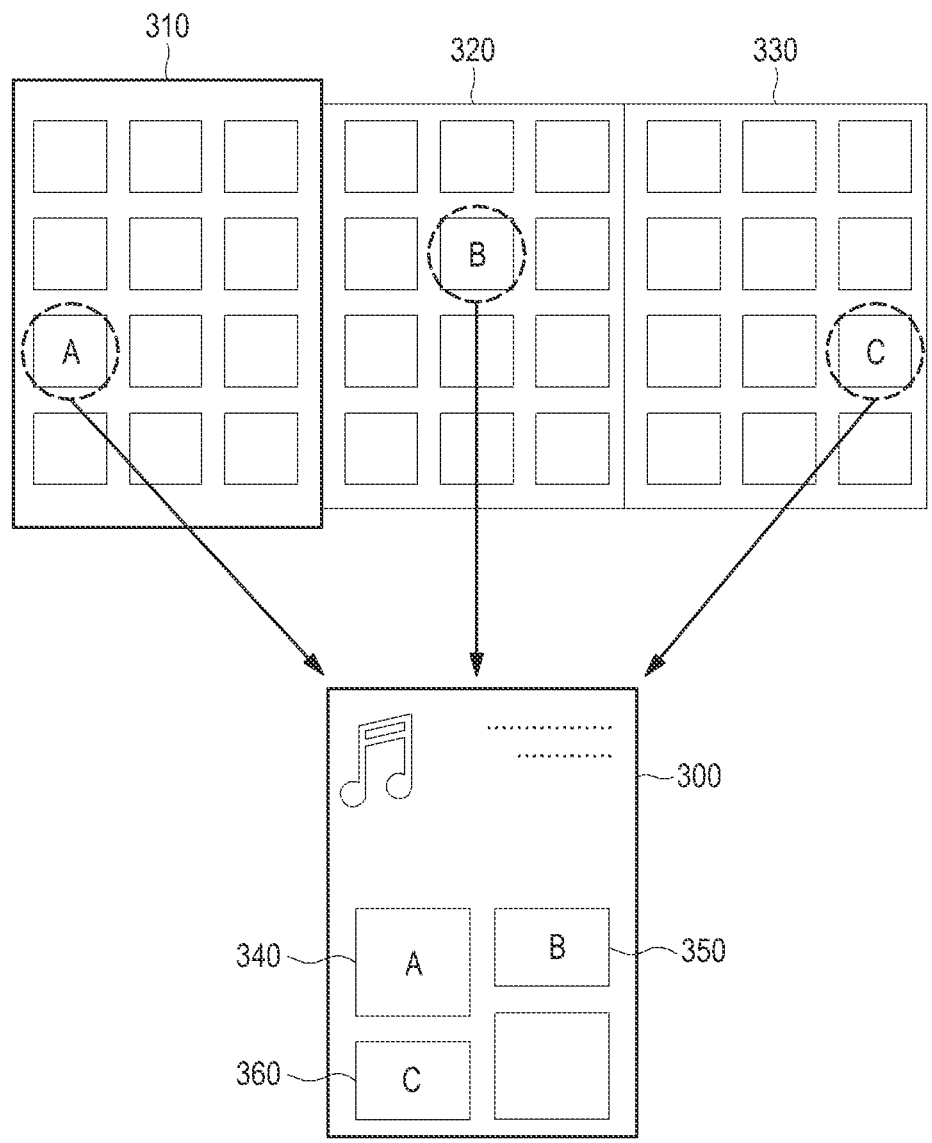
FIG. 3 is a view for describing a method of collecting related services to configure an integrated screen according to an embodiment of the present disclosure.

FIG. 3 is a view for describing a method of collecting related services to configure an integrated screen according to an embodiment of the present disclosure.

Referring to FIG. 3, an example in which objects are shortcut icons is illustrated, wherein each of pages 310, 320, and 330 includes a predetermined number of icons. A user may turn over pages of a menu screen by taking a gesture of flicking or dragging to the right or left on the display 150 (see FIG. 2). If one of the icons is touched, the controller 110 (see FIG. 1) may execute an application corresponding to the touched icon, and display an execution screen of the application on the display 150.

According to an embodiment of the present disclosure, one or more related objects may be collected from the individual pages 310, 320, and 330 and arranged in a plurality of areas 340, 350 and 360 on a screen 300 so that a user can see brief content about a desired object or the related objects. In the related art, when a music application is executed, the music application cannot share content with other related applications. However, according to an embodiment of the present disclosure, when a music application is executed, objects related to the music application can be collected and displayed on an execution screen of the music application.

Figure 4:
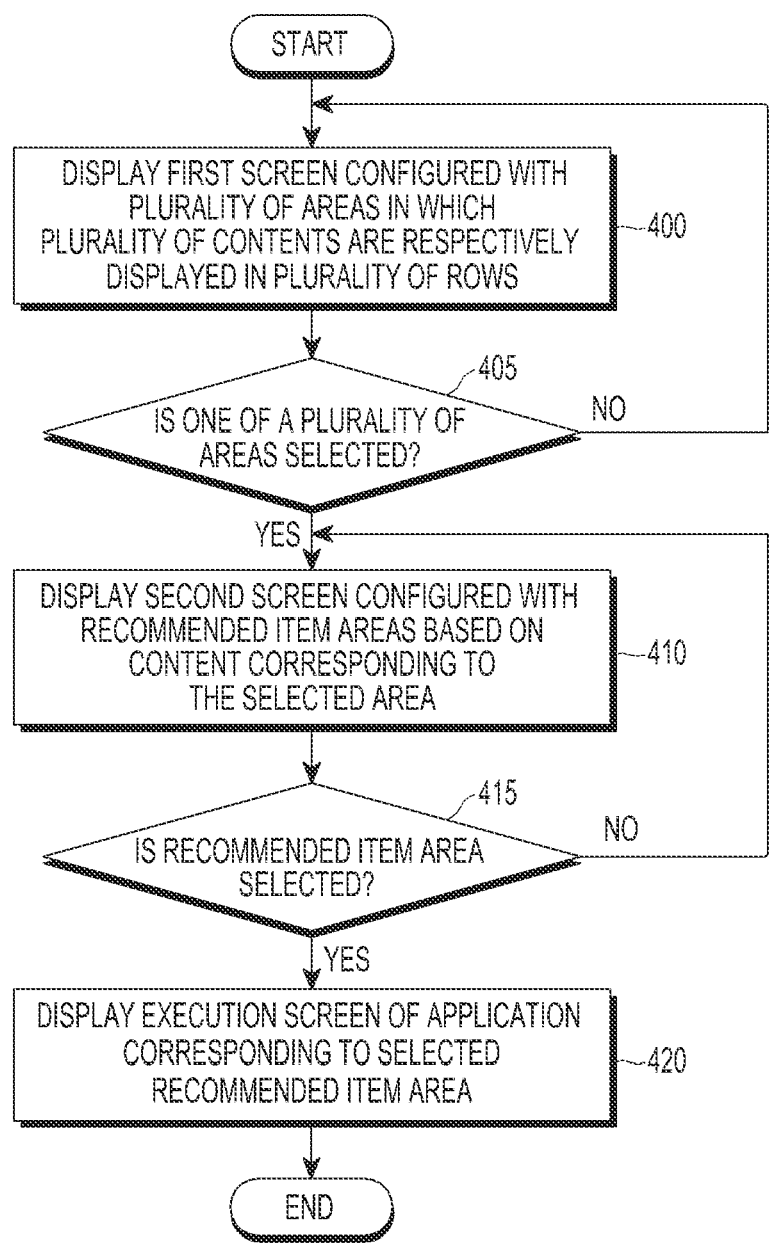
FIG. 4 is a flowchart illustrating a method in which an electronic device configures a recommendation screen based on content according to an embodiment of the present disclosure.

FIG. 4 is a flowchart illustrating a method in which an electronic device configures a recommendation screen based on content according to an embodiment of the present disclosure.

Referring to FIG. 4, the controller 110 (see FIG. 2) may display a first screen configured with a plurality of areas in which a plurality of contents are respectively displayed in a plurality of rows on a touch screen, in operation 400. The first screen configured with the areas for the plurality of contents may correspond to a main screen or a home screen. The main screen or the home screen may be allocated a plurality of areas according to categories, such as music, video, game, etc., and may have a layout configured with such areas. The "areas" configuring the layout can be also referred to as "slices," "grids," "frames," and/or "sections," and the "screen" having the layout can be referred to as a "space."

Figure 5:
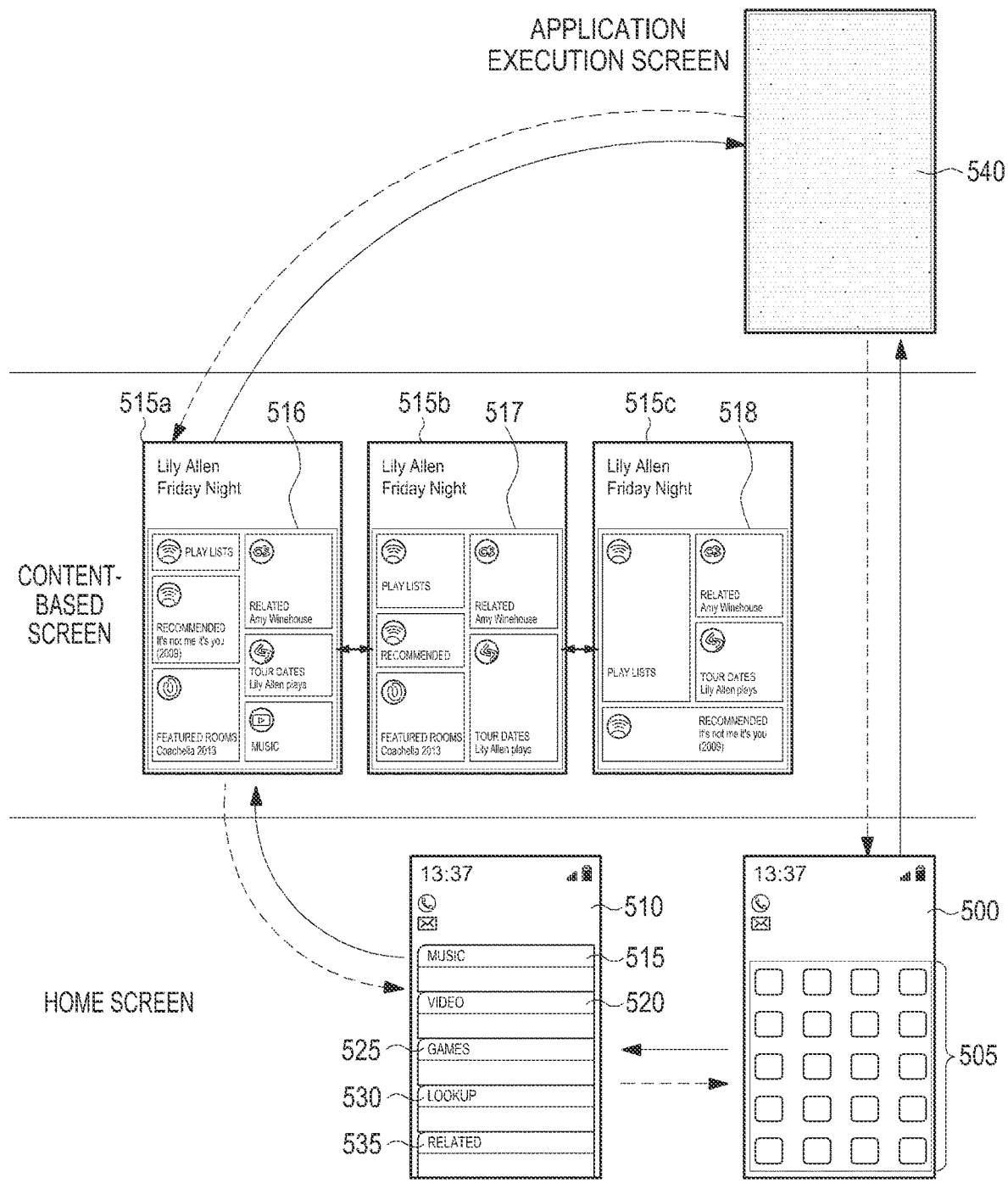
FIG. 5 is a view for describing conversion between a home screen and a recommendation screen based on content according to an embodiment of the present disclosure.

FIG. 5 is a view for describing conversion between a home screen and a recommendation screen based on content according to an embodiment of the present disclosure.

Referring to FIG. 5, a layout that collects and shows services related to content may exist between a home screen 510 and an application execution screen 540 is illustrated. The layout is a screen in which one or more recommended items based on content are displayed. The layout may be configured with a plurality of areas in which related contents are arranged.

Referring to FIG. 5, the home screen 510 may include a plurality of areas 515, 520, 525, and 530 which are respectively displayed in a plurality of rows according to categories, such as music, video, game, lookup, etc., together with an area being a main component of the home screen 510 in which an indicator for notification, an indicator for informing the status of the electronic device, etc. are displayed. The home screen 510 may further include an application area 535 in which a plurality of execution objects for a plurality of applications are collected. The application area 535 may correspond to a menu screen 500 in which a plurality of application execution objects 505 are collected.

The home screen 510 shows overviews of the areas 515, 520, 525, and 530 according to categories. Each of the areas 515, 520, 525, and 530 may display at least one object to identify content related to the corresponding area. The object representing the content may be displayed as an icon configured with an image, text, a picture, and/or a combination of two or more of them. For example, a title of the corresponding content or a part of preliminary information about the corresponding content may be displayed.

Referring back to FIG. 4, if the first screen is displayed, the controller 110 may determine whether one of the plurality of areas of the first screen is selected, in operation 405. If the controller 110 does not determine that one of the plurality of areas of the first screen is selected, the method returns to operation 400.

If the controller 110 determines that one of the plurality of areas of the first screen is selected, the controller 110 may display a second screen configured with one or more recommended item areas based on content corresponding to the selected area, in operation 410. Successively, the controller 110 may determine whether a recommended item area is selected from among the recommended item areas, in operation 415.

If the controller 110 does not determine that an area is selected from among the recommended item areas, the method returns to operation 410. If the controller 110 determines that the area is selected from among the recommended item areas, the controller 110 may display an execution screen of an application corresponding to the selected recommended item area, in operation 420.

Referring to FIG. 5, if an area is selected from among the plurality of areas 515, 520, 525, and 530 on the home screen 510, a recommended item screen based on content corresponding to the selected area may be displayed. For example, if the area 515 corresponding to music content is selected, a recommendation screen based on the music content may be displayed. At this time, the content-based screen (that is, the recommendation screen) may be configured with a plurality of pages 515a, 515b, and 515c according to related information found based on the content. Accordingly, a plurality of recommended item areas 516, 517, and 518 of the respective pages 515a, 515b, and 515c may display different recommended items. Herein, each of a plurality of areas configuring each recommended item area 516, 517, or 518 may correspond to an application. Accordingly, if a recommended item area is selected from the areas 516, 517, and 518 configuring the pages 515a, 515b, and 515c, an application execution screen 540 may be displayed.

Meanwhile, when an area is selected from among the plurality of areas 515, 520, 525, and 530 for the plurality of contents in the home screen 510 of FIG. 5, a configuration of a recommendation screen based on content of the selected area will be described with reference to FIG. 6, and when the application area 535 is selected in the home screen 510 of FIG. 5, a screen configuration will be described with reference to FIGS. 7A to 7C.

Figure 6:
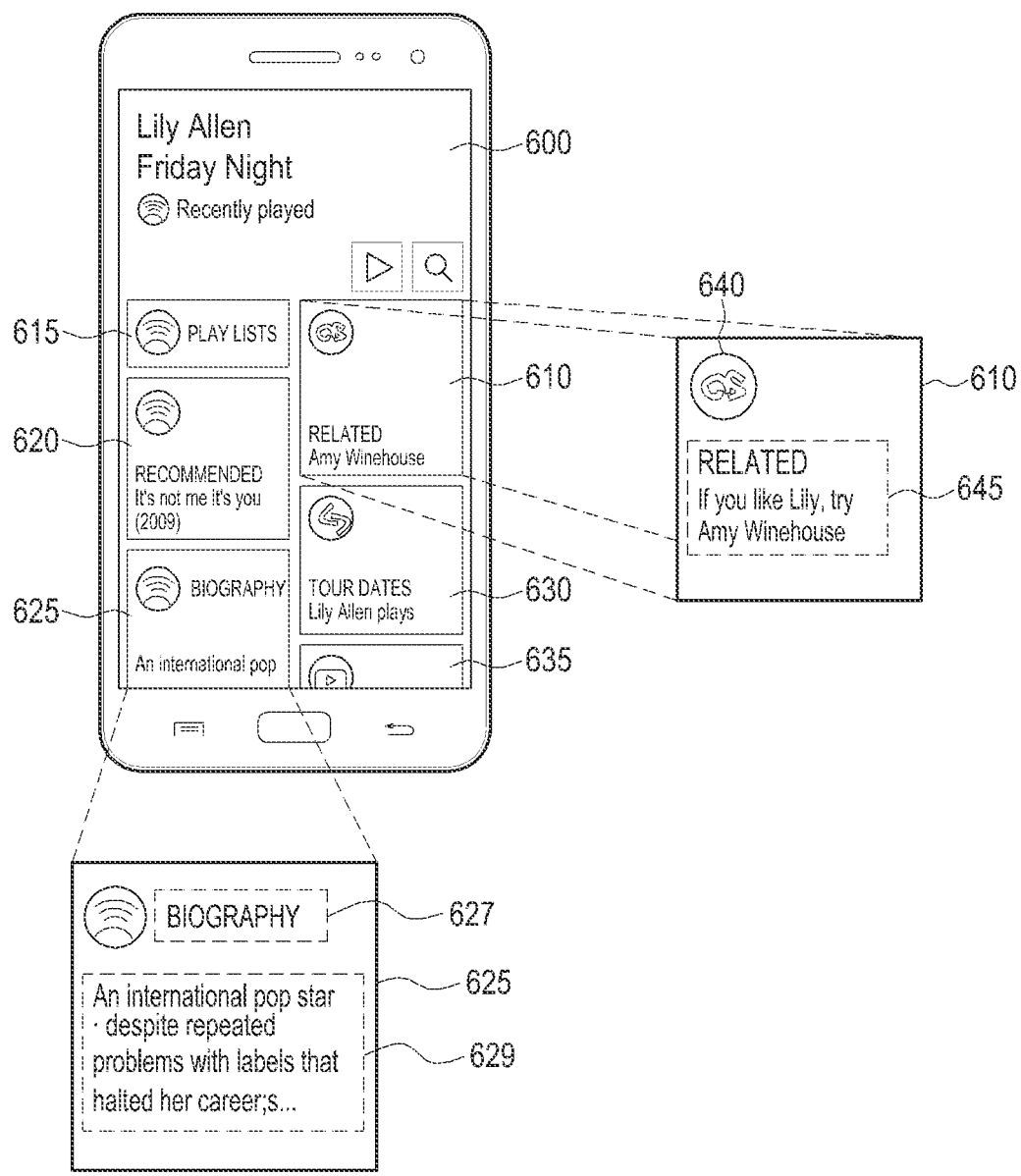
FIG. 6 shows a configuration example of a recommendation screen that is displayed when a content-based area is selected from among a plurality of areas of a home screen according to an embodiment of the present disclosure.

FIG. 6 shows a configuration example of a recommendation screen that is displayed when a content-based area is selected from among a plurality of areas of a home screen according to an embodiment of the present disclosure.

Referring to FIG. 6, a layout 600 is illustrated, where the layout 600 is configured with a plurality of areas 610, 615, 620, 625, 630, and 635. The areas 610, 615, 620, 625, 630, and 635 may display information related to content corresponding to an area selected from among a plurality of areas according to categories, configuring a home screen.

In order to do this, the controller 110 (see FIG. 1) may identify the content corresponding to the area selected from among the areas according to categories, configuring the home screen, search for information related to the identified content, and then classify the found information related to the content. At this time, the controller 110 may search for the information related to the identified content using an attribute of the identified content, the attribute including at least one of a kind and a name of the identified content. Also, the controller 110 may classify the found information related to the content according to recommended items, using metadata of the identified content. Here, the metadata of the content may include content information.

Each of the areas 610, 615, 620, 625, 630, and 635 may display preliminary information about the corresponding area in the form of various objects. For example, the area 610 may display an object of a shortcut icon 640 for executing the corresponding application, and an object of content 645 related to the application. As another example, the area 625 may display an object of a title 627, and an object of preliminary information 629. Also, the objects may be various kinds of visual objects, such as components (for example, pictures, illustrations, characters (letterings or logos), and symbols) and various contents (for example, text, widgets, icons representing documents with various formats of files, and folders). Also, the objects may be one or more visual objects selected from among the aforementioned visual objects.

The areas according to recommended items may be classified into two types. For example, the areas may be classified into areas of providing a shortcut to a feature, and areas of showing content of the corresponding page in advance while providing a shortcut to the feature.

According to an embodiment, if a user touches content displayed in the area 625, the screen may move to a page of the content so that the user can see the page of the content.

According to another embodiment, the user may see additional information 629 by touching the area 625 or the content displayed in the area 625. For example, the area 625 may be enlarged in correspondence to a location touched by the user so as to display the remaining part of the content not shown before the touch operation occurs. Successively, if the user's input of touching the area 625 is again received, the screen may move to the page of the corresponding content so that the user can see the page of the content.

According to an embodiment, if the user touches the shortcut icon 640 for executing the application of the area 610, the application of the area 610 may be executed so that the user can see an application execution screen displayed as a full screen.

The layout 600 corresponding to a recommendation screen based on content may be configured in such a way which one or more areas are arranged on a background plane. The layout 600 may be configured according to various subjects. For example, the layout 600 may be configured according to a user's operations, the characteristics of contents, etc. Also, the layout 600 may be configured according to a current location, time, sensor data, etc. Also, the layout 600 may be configured according to service categories. The layout 600 may be edited, deleted, or created according to a user's tastes. Also, the layout 600 may be a downloaded layout.

The layout 600 may be classified into an open layout and a closed layout according to its attributes.

The open layout may enable a user to search for a recommended item, such as music, video, game, and/or a social service, and may be configured with one or more pages each including one or more areas in which various objects are arranged. For example, in a case of video, a layout of recommending related contents based on content and discovery can be configured. Also, in a case of a social service, a layout with a function of providing overviews of various social services can be configured.

Also, in a case of music, a layout with a plurality of areas in which applications, such as Spotify, Last.fm, Shazam, YouTube, and Tune in Radio, are arranged can be configured. For example, when the application Spotify is executed to play music, contents related to the music may be displayed in the respective areas. Also, when the application YouTube is executed, contents recommending related music videos may be displayed in the respective areas. Also, when the application Last.fm is executed, contents recommending related artists may be displayed in the respective areas.

Meanwhile, the closed layout may restrictively allow a user to search for a recommended item, like a calendar, and may be configured with one or more areas in which one or more objects of limited contents, such as a previous schedule, a today's schedule, and a current schedule, are arranged.

The background plane may display content corresponding to content based on a user's current operation, content, etc. In the respective areas 610, 615, 620, 625, 630, and 635, contents that are provided from services related to the content displayed on the background plane may be displayed.

FIGS. 7A to 7C are views for describing screen conversions when an application area is selected from among a plurality of areas of a home screen according to various embodiments of the present disclosure.

Referring to FIGS. 7A to 7C, examples of a home screen 700 are illustrated, in which the home screen 700 is configured with a plurality of areas 710, 720, 730, and 740 respectively corresponding to a plurality of contents, such as music, video, game, and lookup, and is configured with an application area 750.

If a user selects the application area 750 of the home screen 700 as shown in FIG. 7A, a screen in which a plurality of execution objects for a plurality of applications are arranged may be displayed, as shown in FIG. 7C. The screen as shown in FIG. 7C may be displayed according to a user's input of touching the application area 750. However, the screen conversion may be performed in various ways according to a user's input types. The user's inputs may include a double click input and a touch and drag input. For example, if the user touches and drags the application area 750 of FIG. 7A upward, the size of the application area 750 may be enlarged, as shown in FIG. 7B, to display other application objects not shown, thereby displaying the screen as shown in FIG. 7C.

FIGS. 8A to 8E are views for describing a process in which content that is displayed on a recommendation screen based on content changes according to various embodiments of the present disclosure.

Referring to FIGS. 8A to 8E, if a user selects an area 800 in a home screen configured with a plurality of areas divided according to service categories, as shown in FIG. 8A, a plurality of areas in which one or more recommended items based on content related to the selected area 800 are arranged may be displayed, as shown in FIG. 8B. At this time, in order for the user to identify contents corresponding to the respective areas, each area may display at least one object as an icon configured with an image, text, a picture, or a combination of two or more of them, together with a title of the object.

According to an embodiment, the areas configuring the home screen and the objects that are displayed in the respective areas and may be updated according to the contents of the current content or the latest content.

For example, referring to FIG. 8A, an example of an image of a recently executed music service displayed in an area 800 corresponding to a music category is shown. If the area 800 is selected, a recommendation screen 810 based on music content may be displayed as shown in FIG. 8B. At this time, information related to content corresponding to the area 800 may be searched for based on a kind, a name, etc. of the content. Accordingly, content that is displayed in a background plane and information that is arranged in individual recommended item areas may be decided, as shown in FIG. 8B. The content that is displayed in the background plane may include at least one of an image, related text information, and application information.

If music is played in the recommendation screen 810 based on the music content as shown in FIG. 8B, a play screen as shown in FIG. 8C may be displayed. Thereafter, if the next music is played, the screen may be updated to display content related to the music being currently played, as shown in FIG. 8D. Thereafter, if the screen returns to a home screen as shown in FIG. 8E, the recently updated content may be displayed in the respective areas configuring the home screen in such a way that the content related to the recently played music is displayed in an area 820 corresponding to a music category of the home screen.

In FIG. 8D, an example in which contents of areas configuring a home screen are updated is shown. However, contents that are displayed in the recommended item areas configuring the recommendation screen as shown in FIG. 8B may be updated in correspondence to content displayed in the background plane.

Figures 9A, 9B:
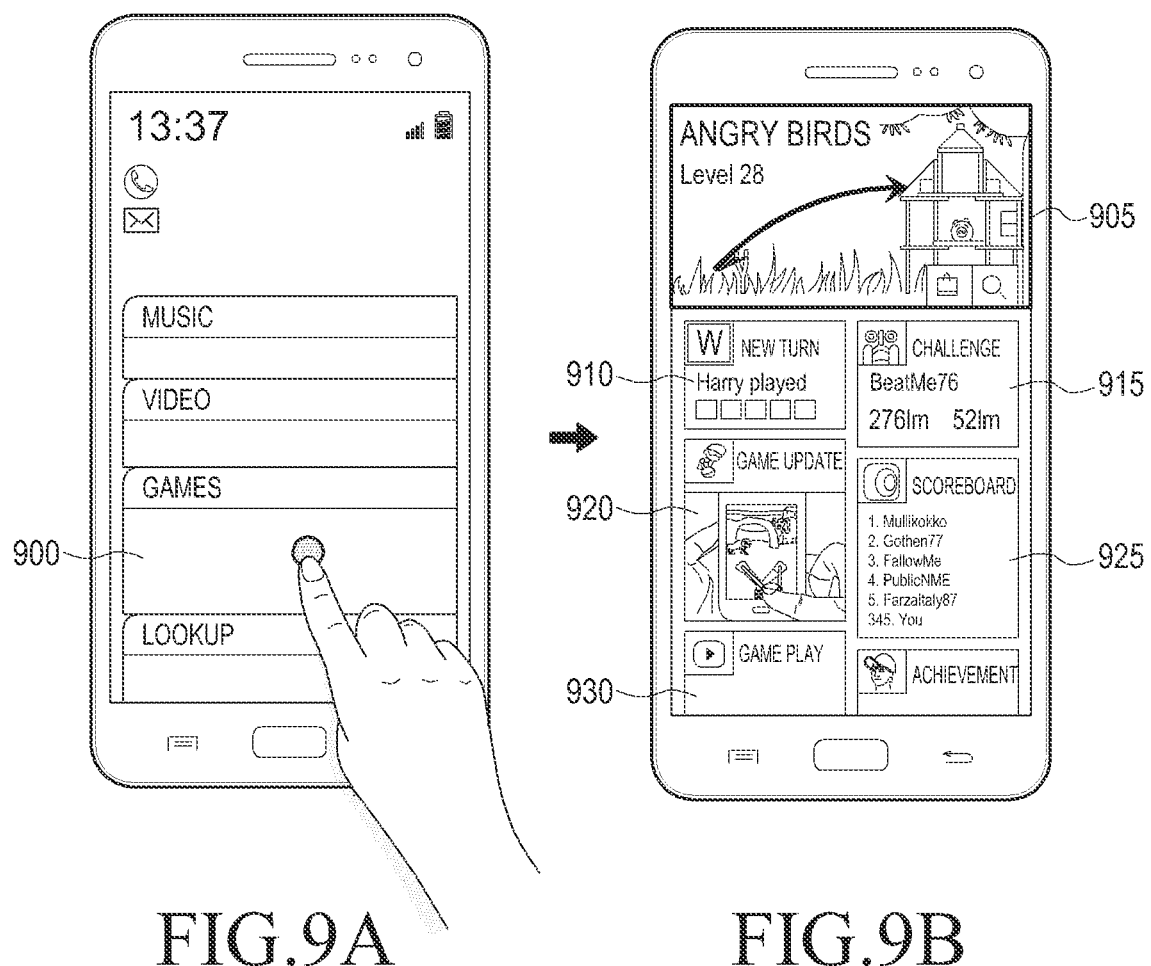
FIGS. 9A and 9B show examples of a recommendation screen based on game content that is displayed when game content is selected according to various embodiments of the present disclosure.

FIGS. 9A and 9B show examples of a recommendation screen based on game content that is displayed when game content is selected according to various embodiments of the present disclosure.

Referring to FIGS. 9A and 9B, if an area 900 corresponding to game content is selected as shown in FIG. 9A, information related to the game content may be arranged in recommended item areas 910, 915, 920, 925, and 930, and a recommendation screen showing content of a recently executed game application related to the game content may be displayed in a background plane 905, as shown in FIG. 9B.

For example, information about a game recently executed or downloaded may be displayed in the background plane 905, and a score board, a graded list, a best record, other associated games, associated video, etc. related to the game may be arranged in the respective recommended item areas 910, 915, 920, 925, and 930.

Figures 10A, 10B:
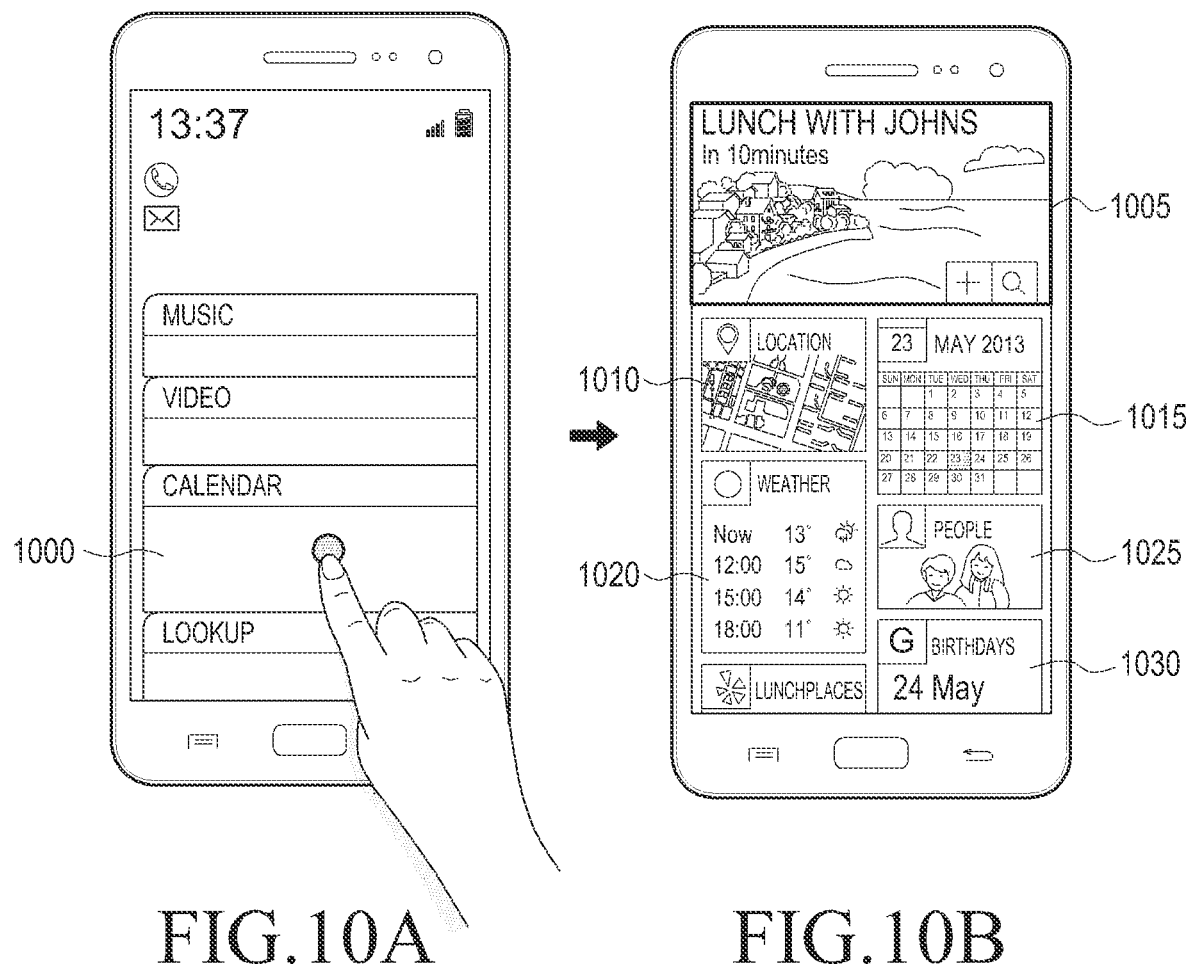
FIGS. 10A and 10B show examples of a recommendation screen based on calendar content that is displayed when calendar content is selected according to various embodiments of the present disclosure.

FIGS. 10A and 10B show examples of a recommendation screen based on calendar content that is displayed when calendar content is selected according to various embodiments of the present disclosure.

Referring to FIGS. 10A and 10B, an area 1000 corresponding to calendar content is selected as shown in FIG. 10A, information related to the calendar content may be arranged in recommended item areas 1010, 1015, 1020, 1025, and 1030, and event content related to the calendar content may be displayed in a background plane 1005, as shown in FIG. 10B.

For example, event content may be displayed in the background plane 1005, and objects, such as a place of a corresponding event, a date of the corresponding event, weather information at the date, associated contact numbers, additional information about the place, and additional information about the event date, may be arranged in the recommended item areas 1010, 1015, 1020, 1025, and 1030, respectively.

FIGS. 11A to 11D show examples of a recommendation screen based on video content that is displayed when video content is selected according to various embodiments of the present disclosure.

Referring to FIGS. 11A to 11D, an area 1100 corresponding to video content is selected as shown in FIG. 11A, information related to the video content may be arranged in a plurality of recommended item areas 1110, 1115, 1120, 1125, 1130, and 1135, and content related to the video content may be displayed in a background plane 1105, as shown in FIG. 11B.

If a user has not used any video content, the background plane 1105 and the recommended item areas 1110, 1115, 1120, 1125, 1130, and 1135 may be empty spaces in which no information is displayed, or may display contents recommended by a server and contents of one or more applications recommended by the server. Alternatively, the background plane 1105 and the recommended item areas 1110, 1115, 1120, 1125, 1130, and 1135 may display one or more initial applications related to video, stored in the library of the memory 130 (see FIG. 1).

Also, if the user touches and scrolls the screen of FIG. 11B upward, other recommended areas 1135 and 1140 not shown or partially shown in the screen of FIG. 11B may be displayed, as shown in FIG. 11C. Also, referring to FIG. 11D, items not downloaded yet may be displayed as recommended item areas 1150, 1155, and 1160 that are in a deactivated state. For example, the user may add items (for example, video items such as Netflix and HBO Go) that are arranged in recommended item areas. The deactivated state may represent that a user needs to download a related application or to join a related site, or may represent a link to move to a related site according to a user's touch input. One or more applications related to video content being currently played may be searched for and recommended by Store 1115. The recommended item areas 1150, 1155, and 1160 that are in the deactivated state may be arranged in the last position of recommended items areas.

FIG. 12 is a view for describing a method for left-right movements between recommendation screens based on content according to an embodiment of the present disclosure.

Referring to FIG. 12, an example in which content of a layout is updated is illustrated. For example, in an open layout, if a user takes a gesture of turning over a first screen 1200 to the right with his/her finger, recommendation screens, such as a second screen 1210 and a third screen 1220, which are successively updated, may be displayed. Meanwhile, in a closed layout, related content such as an approaching event in which a user may be continuously interested may be provided.

For example, content 1201, 1202, 1203 and 1204 is arranged on first screen 1200, content 1211, 1212, 1213 and 1214 is arranged on second screen 1210 and content 1221, 1222, 1223, 1224 and 1225 is arranged on screen 1220.

Figure 13:
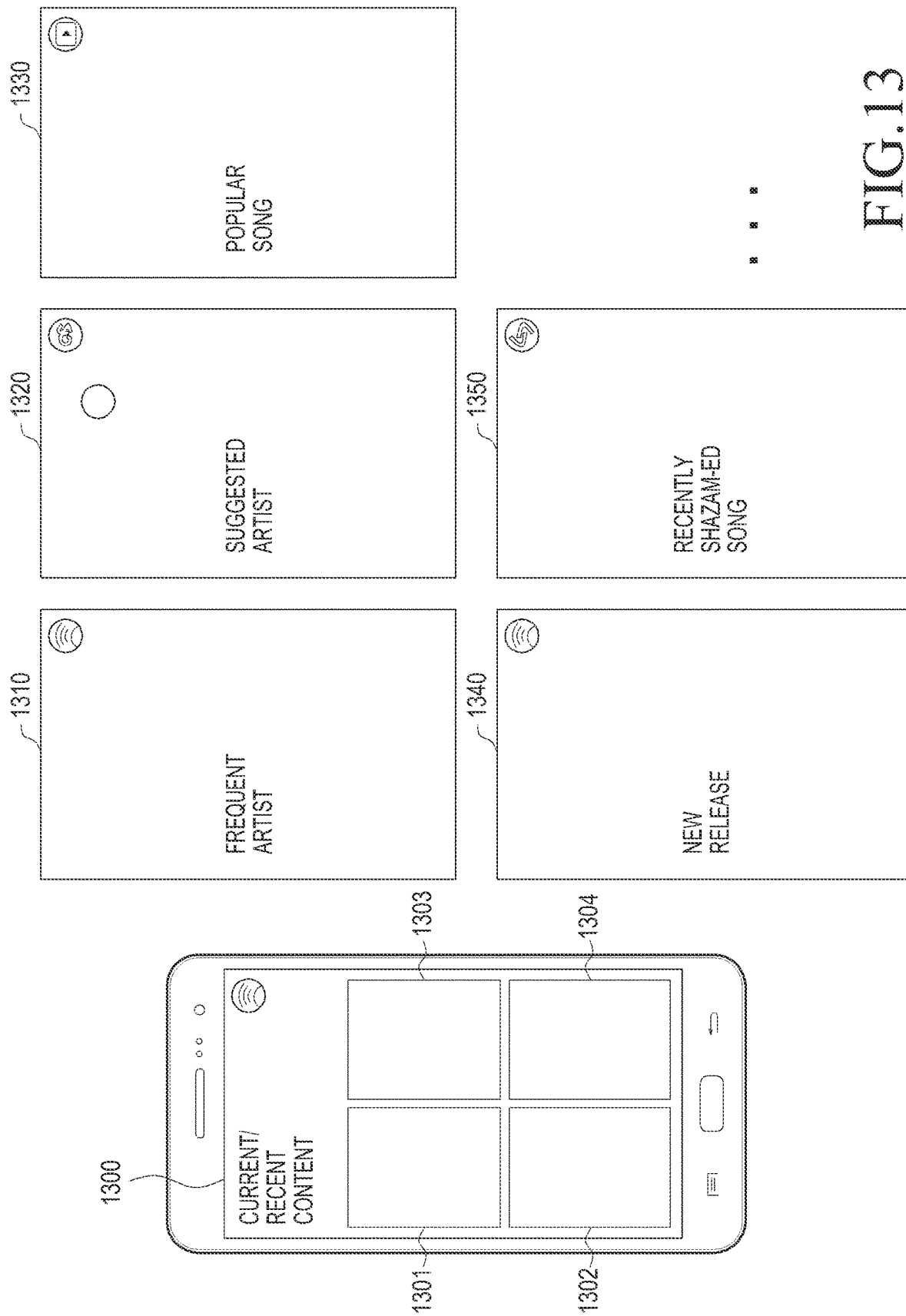
FIG. 13 shows items configuring recommendation screens according to an embodiment of the present disclosure.

FIG. 13 shows items configuring recommendation screens according to an embodiment of the present disclosure. FIG. 14 shows items configuring recommendation screens according to an embodiment of the present disclosure.

Referring to FIG. 13, various kinds of information 1310, 1320, 1330, 1340, and 1350 related to music content, which are arranged in a background plane 1300, are illustrated, and a plurality of recommended item areas 1301, 1302, 1303, and 1304, are illustrated. If a user takes a drag or flick gesture of turning over a plurality of pages, the user can see a recommendation screen configured with related information of related applications, such as Frequent Artist 1310, Suggested Artist 1320, Popular Song 1330, New Release 1340, and Recently Shazam-ed Song 1350.

Referring to FIG. 14, various kinds of information 1410, 1420, 1430, 1440, and 1450 related to video content, which are arranged in a background plane 1400, are illustrated, and a plurality of recommended item areas 1401, 1402, 1403, and 1404, are illustrated. If a user takes a drag or flick gesture of turning over a plurality of pages, the user can see a recommendation screen configured with related information of related applications, such as New Episode of Series You Watch 1410, Promotion of New Series 1420, New Release 1430, Deal of the Week 1440 and Popular Clip Based on Your Taste 1450.

FIGS. 15A to 15D are views for describing a method of minimizing recommended item areas in response to a user's input according to various embodiments of the present disclosure.

Figure 15A:
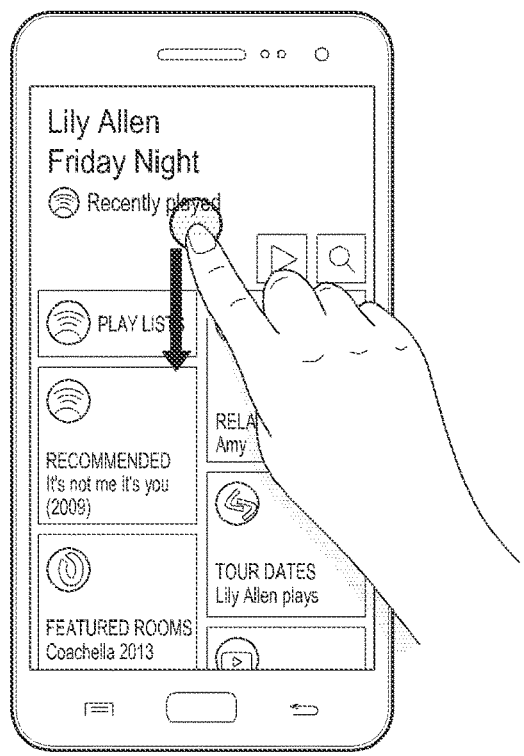
FIGS. 15A, 15B, 15C, and 15D are views for describing a method of minimizing recommended item areas in response to a user's input according to various embodiments of the present disclosure.
Figure 15B:
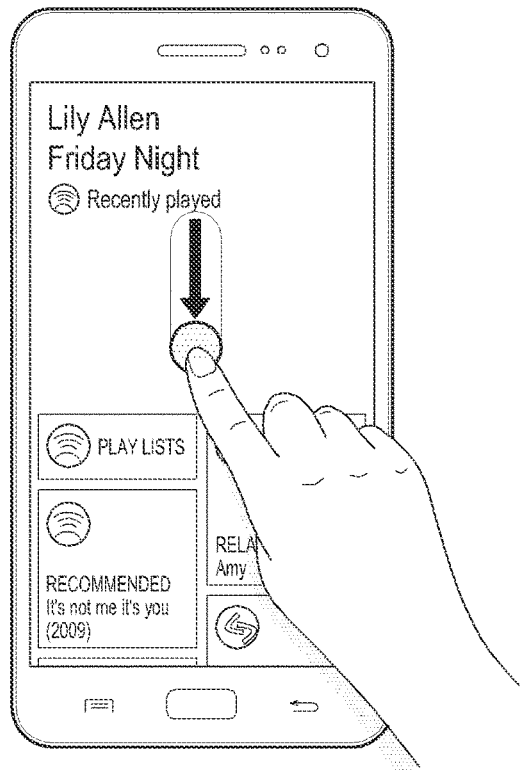
Figure 15C:
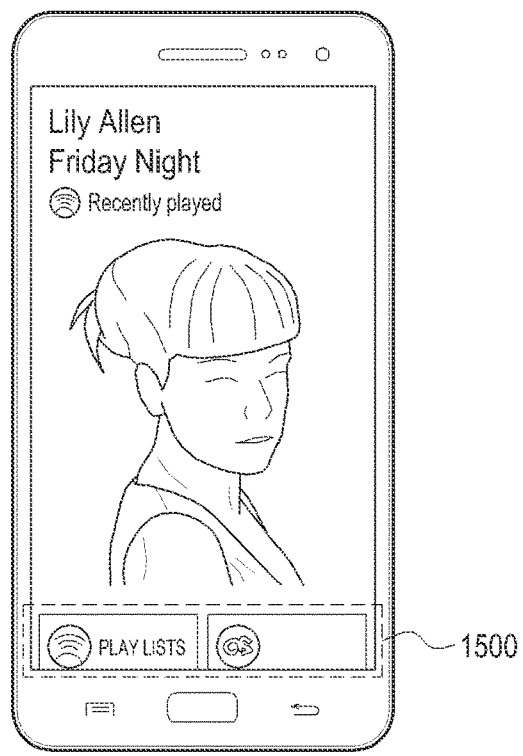

Referring to FIGS. 15A to 15D, a user touches and drags a location on a recommendation screen downward with his/her finger as shown in FIG. 15A, the sizes of recommended item areas may be reduced, as shown in FIG. 15B, and then minimized and displayed in the lower part of the screen, as shown in FIG. 15C. As such, by minimizing services through a swipe down operation, a full screen mode may be provided in which the user can concentrate on content shown in a background plane.

Figure 15D:
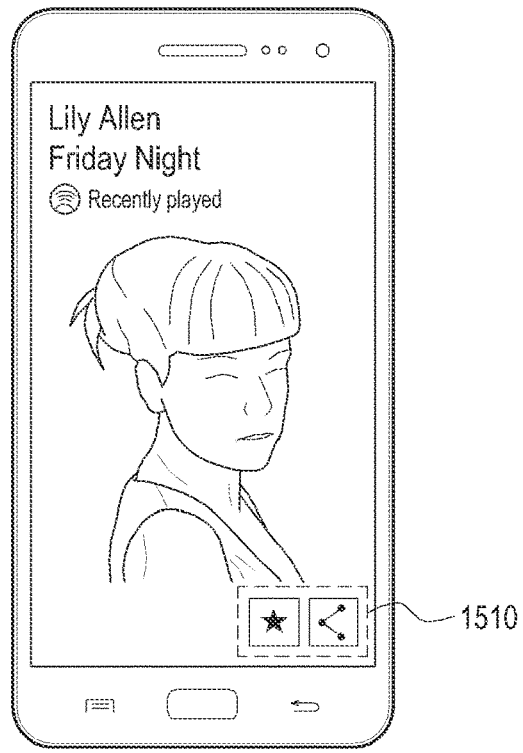

In the full screen mode as shown in FIG. 15C, an operation related to the content shown in the background plane can be executed. In FIG. 15C, an example of the recommended item areas being minimized so that a part 1500 of the recommended item areas is displayed in the screen is illustrated. However, one or more action buttons 1510 may be displayed, as shown in FIG. 15D.

Figure 16C:
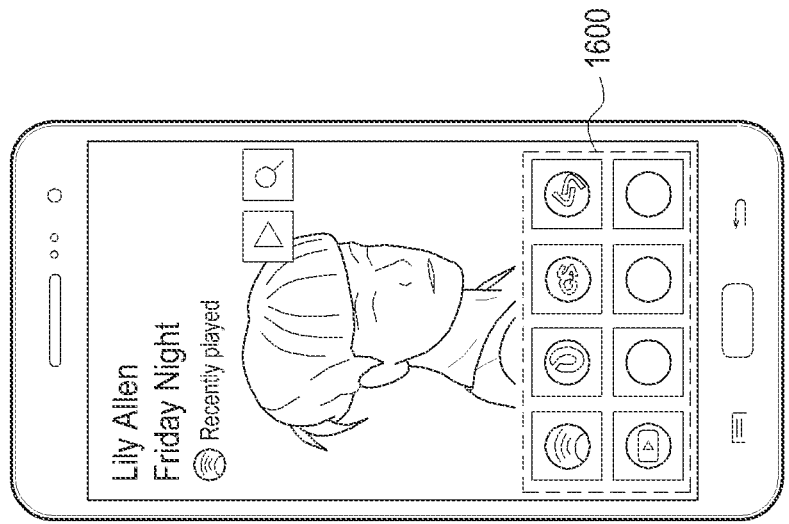
FIGS. 16A, 16B, and 16C are views for describing a method of changing a screen configuration using pinch zooming according to various embodiments of the present disclosure.
Figure 16B:
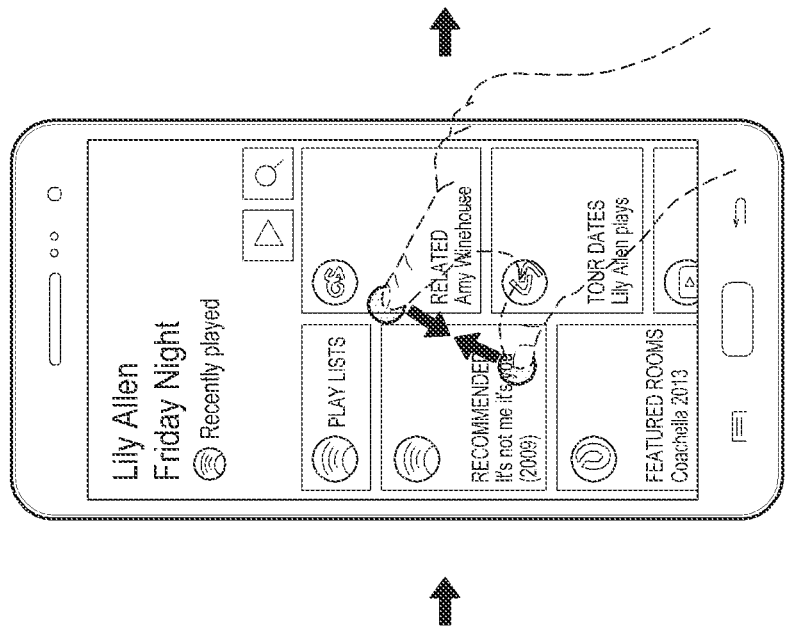
Figure 16A:
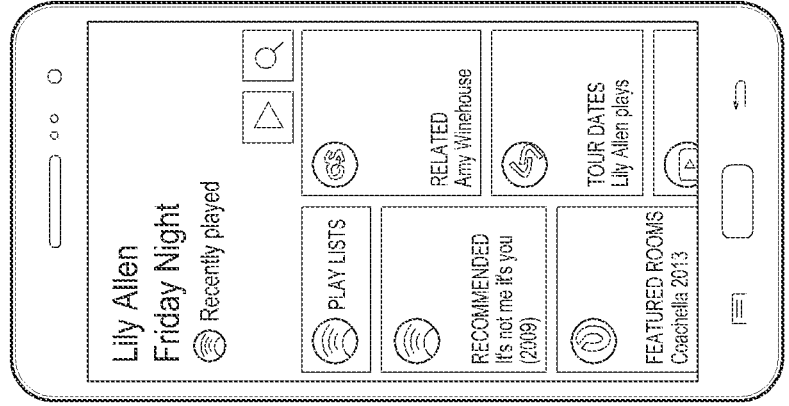
Figures 17A, 17B:
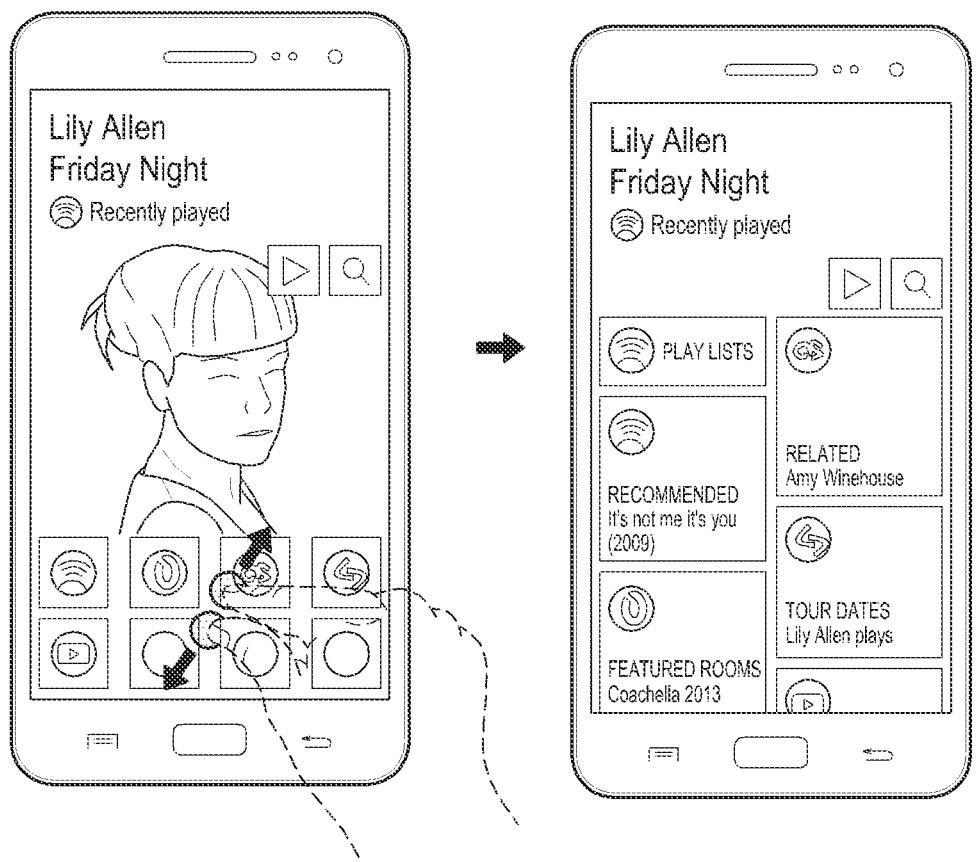
FIGS. 17A and 17B are views for describing a method of changing a screen configuration using pinch zooming according to various embodiments of the present disclosure.

FIGS. 16A to 16C are views for describing a method of changing a screen configuration using pinch zooming according to various embodiments of the present disclosure. FIGS. 17A and 17B are views for describing a method of changing a screen configuration using pinch zooming according to various embodiments of the present disclosure Referring to FIGS. 16A to 16C, if a user takes a pinch gesture of putting his/her two fingers together as shown in FIG. 16B when a layout configured with a plurality of areas is displayed as shown in FIG. 16A, the areas may be displayed as if they are folded, as shown in FIG. 16C. For example, since the sizes of the areas are minimized, icons 1600 representing the areas, instead of contents representing the areas, may be displayed. Thereafter, if the user takes a gesture of outstretching his/her two fingers as shown in FIG. 17A, the minimized areas may return to their original sizes, as shown in FIG. 17B.

According to various embodiments of the present disclosure, by collecting related services and displaying a screen configured with related items in an electronic device, it is possible to provide a user with abundant experiences.

Also, according to various embodiments of the present disclosure, since all services can be linked to each other on an integrated screen based on predetermined objects in an electronic device, it is possible to apply services without using a complex backend and to provide a link to a web-based platform model.

Also, according to various embodiments of the present disclosure, by displaying recommended items corresponding to a current situation in various ways, a user can easily check recommended items and have a large variety of choice. Accordingly, a provider can easily promote contents and services, and easily add new subjects and services.

Various embodiments of the present disclosure may be realized in the form of hardware, software, or a combination of hardware and software. Any such software may be stored in volatile or non-volatile storage such as, for example, a storage device like a ROM, whether erasable or rewritable or not, in memory such as, for example, RAM, memory chips, device or integrated circuits, or in an optically or magnetically writable, machine (e.g., a computer)-readable medium such as, for example, a Compact Disk (CD), DVD, magnetic disk or magnetic tape or the like. A memory that can be included in the electronic device is an example of a machine-readable storage medium suitable to store a program or programs including instructions for implementing various embodiments of the present disclosure. Accordingly, the methods according to the embodiments of the present disclosure include a program comprising code for implementing an apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Also, the electronic device may receive and store the program from a program providing apparatus connected wiredly or wirelessly to the electronic device. The program providing apparatus may include a program including instructions for instructing the electronic device to perform the screen display method, memory to store information needed to perform the screen display method, a communication unit to perform wired or wireless communication with the electronic device, and a controller to transmit the program to the electronic device according to a request from the electronic device or automatically.

Additionally, various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of displaying a screen on an electronic device, the method comprising:
controlling, by a processor of the electronic device, a display of the electronic device to display a first screen including a plurality of areas which respectively corresponds to a plurality of categories, wherein an image representing a content of an application is displayed within at least one area among the plurality of areas, the application being recently executed and associated with a category corresponding to the at least one area; and in response to a first touch input on the at least one area, controlling, by the processor, the display to display a second screen including a user interface and a plurality of recommended items, the user interface including at least one object associated with a function of the application, the plurality of recommended items corresponding to the category, wherein the image is displayed on a background of the second screen.

2. The method of claim 1, further comprising:
in response to receiving a second touch input on the at least one object, executing the function of the application.

3. The method of claim 1, wherein the first screen is a home screen of the electronic device.

4. The method of claim 1, further comprising:
in response to receiving a third touch input on the second screen, moving the plurality of recommended items, wherein a position of the user interface is maintained.

5. The method of claim 1, wherein at least one recommended item area among a plurality of recommended item areas which respectively include one or more objects of the category, is allowed to be deleted from and edited on the second screen, and a new recommended item area is allowed to be added on the second screen.

6. The method of claim 1, further comprising:
identifying, if an area is selected from among the plurality of areas of the first screen, a content corresponding to the selected area by the processor;
searching, by the processor, for and finding information related to the identified content; and
classifying, by the processor, the found information related to the content.

7. The method of claim 1, wherein the plurality of categories include at least one of music, video, game, or lookup.

8. An electronic device for displaying a screen, the electronic device comprising:
a display; and
a processor configured to:
display a first screen including a plurality of areas which respectively corresponds to a plurality of categories, wherein an image representing a content of an application is displayed within at least one area among the plurality of areas, the application being recently executed and associated with a category corresponding to the at least one area, and
in response to a first touch input on the at least one area, display a second screen including a user interface and a plurality of recommended items, the user interface including at least one object associated with a function of the application, the plurality of recommended items corresponding to the category, wherein the image is displayed on a background of the second screen.

9. The electronic device of claim 8, wherein the processor is further configured to execute the function of the application in response to receiving a second touch input on the at least one object.

10. The electronic device of claim 8, wherein the first screen is a home screen of the electronic device.

11. The electronic device of claim 8, wherein the processor is further configured to move the plurality of recommended items in response to receiving a third touch input on the second screen, wherein a position of the user interface is maintained.

12. The electronic device of claim 8, wherein the processor is further configured to identify, if an area is selected from among the plurality of areas of the first screen, a content corresponding to the selected area, to search for and find information related to the identified content, and to classify the found information related to the content.

13. The electronic device of claim 12, wherein the processor is further configured to search for the information related to the identified content using an attribute of the content, the attribute including at least one of a kind and a name of the content.

14. The electronic device of claim 12, wherein the processor is further configured to classify the found information related to the content according to recommended items, using metadata of the content.

15. The electronic device of claim 14, wherein the metadata of the content includes content information.

16. A non-transitory computer-readable storage medium storing instructions that, when executed, cause at least one processor to perform the method of claim 1.

* * * * *